US012743716B2

(12) United States Patent
Yanase

(10) Patent No.: US 12,743,716 B2
(45) Date of Patent: Sep. 22, 2026

(54) COMMODITY SALES SYSTEM AND COMMODITY SALES METHOD USING AGE VERIFICATION FOR IN-STORE SETTLEMENT

(71) Applicant: Glory Ltd., Himeji (JP)

(72) Inventor: Kisho Yanase, Himeji (JP)

(73) Assignee: GLORY LTD., Himeji (JP)

( * ) Notice: Subject to any disclaimer, the term of this patent is extended or adjusted under 35 U.S.C. 154(b) by 92 days.

(21) Appl. No.: 18/603,407

(22) Filed: Mar. 13, 2024

(65) Prior Publication Data

US 2024/0311898 A1 Sep. 19, 2024

(30) Foreign Application Priority Data

Mar. 16, 2023 (JP) ................................ 2023-041914

(51) Int. Cl.
*G06Q 30/0601* (2023.01)
*G06Q 20/18* (2012.01)
(Continued)

(52) U.S. Cl.
CPC ......... *G06Q 30/0607* (2013.01); *G06Q 20/18* (2013.01); *G06Q 20/20* (2013.01); *G06V 40/178* (2022.01)

(58) Field of Classification Search
CPC ...... G06Q 20/18; G06Q 20/20; G06Q 20/203; G06Q 20/206; G06Q 20/208;
(Continued)

(56) References Cited

U.S. PATENT DOCUMENTS 12,045,024 B2 * 7/2024 Patel ....................... A24F 40/53
2002/0016740 A1 * 2/2002 Ogasawara .......... G07G 1/0036 705/14.27
(Continued)

FOREIGN PATENT DOCUMENTS

WO 2021/066000 A1 4/2021

OTHER PUBLICATIONS

Supermarket cameras to guess age of alcohol buyers. Feb. 2, 2022. Jane Wakefield. Technology reporter. (Year: 2022).*
(Continued)

*Primary Examiner* — William J Allen
(74) *Attorney, Agent, or Firm* — XSENSUS LLP

(57) ABSTRACT

A commodity sales system for selling a specific commodity for which a purchase qualification needs to be confirmed includes: a commodity detection sensor to detect a commodity that the customer takes from a commodity shelf; a confirmation device configured to confirm the purchase qualification for the specific commodity by performing a confirmation process on a qualification certifying matter; a commodity handling device configured to make the specific commodity selectable for the customer in a case that the purchase qualification is confirmed by the confirmation process; a management apparatus including configured to add, to an object of transaction with the customer, the commodity detected by commodity detection sensor, and the specific commodity selected with the commodity handling device; and a settlement apparatus configured to perform a settlement process for an amount of transaction with the customer, for the commodities that the management apparatus has added to the object of transaction.

9 Claims, 14 Drawing Sheets

(51) Int. Cl.
*G06Q 20/20* (2012.01)
*G06V 40/16* (2022.01)

(58) Field of Classification Search
CPC .......... G06Q 20/4014; G06Q 30/0601–06444; G06Q 50/12; G07F 7/00; G07F 7/005; G07F 7/06; G07F 7/0672; G07F 7/069; G07F 9/009
See application file for complete search history.

(56) References Cited

U.S. PATENT DOCUMENTS

2013/0218774 A1* 8/2013 Benschop .............. G06Q 20/40 705/44
2019/0050921 A1* 2/2019 Ryner .................. G06Q 20/326
2019/0259014 A1 8/2019 Katayama et al.
2021/0012400 A1 1/2021 Locke et al.
2021/0406970 A1 12/2021 Patel et al.
2022/0198539 A1* 6/2022 Horiuchi .............. G06V 40/172
2022/0335483 A1 10/2022 Tanabe
2023/0074732 A1* 3/2023 Howard ............... G06V 40/172
2023/0153878 A1* 5/2023 Glaser ................ G06Q 30/0637 705/26.25
2024/0013606 A1* 1/2024 Smee ...................... G07F 9/026
2024/0185690 A1* 6/2024 Hagen .................. G06Q 20/203
2025/0238799 A1* 7/2025 Tsuruoka ............. G06V 40/178

OTHER PUBLICATIONS

Frictionless checkout without scanning or cameras. Patricia Hogan. Susan W Brosnan. Daniel R Goins. Dean F. Herring. Jessica Snead. May 1, 2020. The IP.com Journal. IPCOM000262123D (Year: 2020).*

Video: “Comparison of four different slots of vending machines”. Apr. 8, 2022. Full video available at https://www.youtube.com/watch?v=PLznH4B-Vkl. (Year: 2022).*

Video: “Comparison of four different slots of vending machines”. Apr. 8, 2022. Full video available at https://www.youtube.com/watch?v=PLznH4B-Vkl. (Year: 2022) (Year: 2022).*

European Search Report issued on Apr. 25, 2024 in corresponding European Patent Application No. 24163262.9.

* cited by examiner

FIG.5

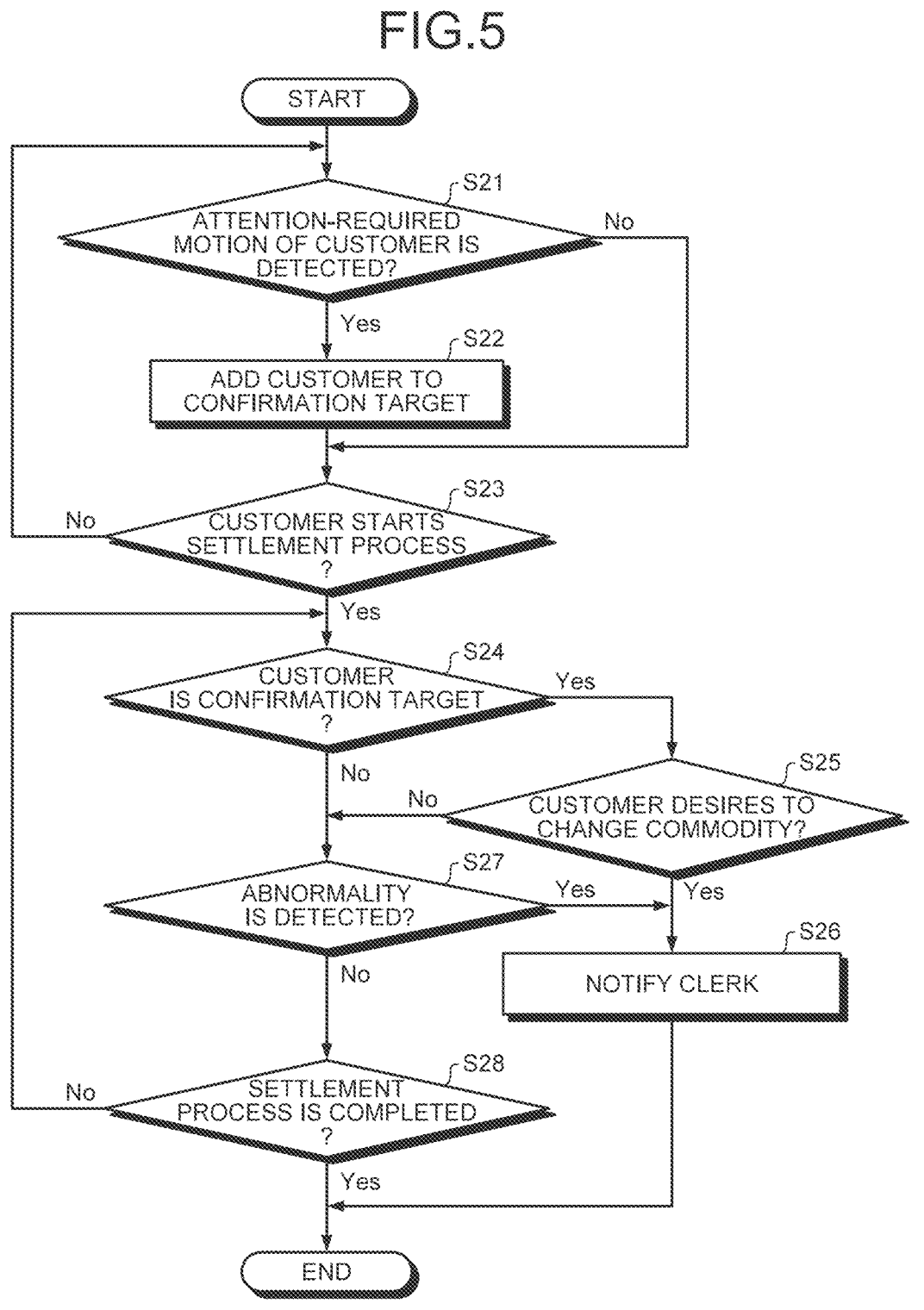

START
S21
ATTENTION-REQUIRED MOTION OF CUSTOMER IS DETECTED?
No
Yes
S22
ADD CUSTOMER TO CONFIRMATION TARGET
S23
CUSTOMER STARTS SETTLEMENT PROCESS ?
No
Yes
S24
CUSTOMER IS CONFIRMATION TARGET ?
Yes
No
S25
CUSTOMER DESIRES TO CHANGE COMMODITY?
No
Yes
S27
ABNORMALITY IS DETECTED?
Yes
No
S26
NOTIFY CLERK
S28
SETTLEMENT PROCESS IS COMPLETED ?
No
Yes
END

611
ORDINARY COMMODITY SALES SHELF
SPECIFIC COMMODITY SALES SHELF
COMMODITY SALES AREA
700
600
711
601
POTATO CHIPS
700
ORDINARY COMMODITY
711
711a
711b
REPLACEMENT
LICENSE
QUALIFICATION CERTIFICATE
CREDIT CARD
CARD
400
410
401
700
POTATO CHIPS
210
230
701
612
300
CASH
220
220

611
ORDINARY COMMODITY SALES SHELF
SPECIFIC COMMODITY SELECTION DEVICE
COMMODITY SALES AREA
700
600
500
POTATO CHIPS
700
ORDINARY COMMODITY
QUALIFICATION CERTIFICATE
CARD
CREDIT CARD
400
401
700
POTATO CHIPS
210
230
701
612
300
CASH
220
220

611
ORDINARY COMMODITY SALES SHELF
SPECIFIC COMMODITY STORAGE DEVICE
COMMODITY SALES AREA
700
600
QUALIFICATION CONFIRMATION DEVICE
310
QUALIFICATION CERTIFICATE
450
POTATO CHIPS
700
701
ORDINARY COMMODITY
SPECIFIC COMMODITY
CARD
CREDIT CARD
210
701
700
POTATO CHIPS
230
612
CASH
220
220

COMMODITY SALES SYSTEM AND COMMODITY SALES METHOD USING AGE VERIFICATION FOR IN-STORE SETTLEMENT

CROSS-REFERENCE TO RELATED APPLICATION

The present application claims priority to Japanese Patent Application No. JP 2023-041914 filed Mar. 16, 2023, the entire contents of which is incorporated herein by reference.

TECHNICAL FIELD

The present disclosure relates to a commodity sales system and a commodity sales method for selling, in an unmanned store, a specific commodity for which a purchase qualification needs to be confirmed at the time of selling in the store.

BACKGROUND ART

Stores sometimes sell specific commodities for which purchasers are limited, in addition to ordinary commodities for which purchasers are not limited. When a customer desires to purchase such a specific commodity, a store as a seller needs to confirm whether the customer has a purchase qualification for the specific commodity. Examples of the specific commodity include alcohol and cigarettes for which the age of purchasers is limited. When the customer desires to purchase alcohol or cigarettes, a clerk confirms the age of the customer.

In recent years, stores in which no clerk is present in a commodity sales area, i.e., so-called unmanned stores, have appeared. In an unmanned store, a customer selects a commodity in a commodity sales area, pays for the commodity with a checkout machine, and leaves the store. Since no clerk is present in the commodity sales area in the unmanned store, it is necessary to sell the specific commodities by a method different from that used in manned stores.

WO2021/066000 discloses a system for selling age-limited commodities such as alcohol and cigarettes in an unmanned store. In the unmanned store, a commodity shelf, from which commodities cannot be taken out unless the shelf is unlocked, is installed and used to display age-limited commodities. A process of registering a customer as a member of the store including age confirmation is performed in advance. A process of identifying a customer entering the unmanned store is performed by a device installed at a doorway of the store. If the customer, who has entered the unmanned store, is a registered member whose age has been confirmed to satisfy a condition for purchasing the age-limited commodities, the customer can unlock the commodity shelf by inputting customer identification information into a lock control device for the commodity shelf to purchase an age-limited commodity. As for a customer whose age was not confirmed at the time of membership registration, age confirmation is performed by reading information on a driver's license or the like with a device installed in the store. After it is confirmed that the age of the customer satisfies the condition for purchasing the age-limited commodities and information on the age confirmation result is additionally registered in membership information of the customer, the customer is allowed to purchase the age-limited commodity.

SUMMARY

A commodity sales system according to one aspect of the present disclosure is a system for selling a specific commodity for which a purchase qualification needs to be confirmed when the specific commodity is sold to a customer. The system includes: a customer detection sensor to detect that the customer has entered a store; a commodity detection sensor to detect a commodity that the customer takes from a commodity shelf in the store; a confirmation device including processing circuitry configured to confirm the purchase qualification for the specific commodity by performing a confirmation process on a qualification certifying matter; a commodity handling device configured to make the specific commodity selectable for the customer in a case that the purchase qualification is confirmed by the confirmation process; a management apparatus including processing circuitry configured to add, to an object of transaction with the customer, the commodity detected by commodity detection sensor, and the specific commodity selected with the commodity handling device; and a settlement apparatus including processing circuitry configured to perform a settlement process for an amount of transaction with the customer, for the commodities that the management apparatus has added to the object of transaction.

The objects, features, advantages, and technical and industrial significance of this disclosure will be better understood by the following description and the accompanying drawings of the disclosure.

BRIEF DESCRIPTION OF THE DRAWINGS

FIG. 5 is a flowchart illustrating operation restriction on the customer in a settlement process;

DETAILED DESCRIPTION

Since the system of the conventional art is constructed on the premise of the customer's membership registration for the store, customers need to perform membership registration by inputting various kinds of information before using the store. Customers other than members of the store cannot use the store to purchase commodities and therefore, it may not be easy for customers to use the store.

The present disclosure is made in view of the above problems, as well as other problems, of the conventional art, and the present disclosure addresses these issues, as discussed here, with a commodity sales system and a commodity sales method for realizing an unmanned store that is easy to use for customers who purchase specific commodities.

Hereinafter, a commodity sales system and a commodity sales method according to the present disclosure will be described with reference to the drawings. The commodity sales system according to the present disclosure is used for selling commodities in an unmanned store in which transaction with a customer is performed. The commodities that are sold in the unmanned store include specific commodities for which the store needs to confirm that the customer (purchaser) has a purchase qualification, before selling to the customer.

The unmanned store according to an embodiment of the present disclosure includes a completely unmanned store and a manpower-saving store. The specific commodities according to the present embodiment include a commodity that only the customer having a predetermined purchase qualification can purchase. The kinds of the specific commodities are not particularly limited because the specific commodities vary among stores, or among regions or countries where stores exist. For example, the specific commodities include age-limited commodities such as alcohol and cigarettes for which the ages of purchasers are limited. The specific commodities may include pharmaceuticals, deleterious substances, etc., for which purchasers are limited. The specific commodities may include expensive commodities exceeding a predetermined price. In the present embodiment, the description will be given of a case where specific commodities being age-limited commodities are sold in an unmanned store in which no clerk is stationed in a commodity sales area and a checkout counter, but a clerk stands by in a back office of the store. Hereinafter, commodities other than the specific commodities are referred to as ordinary commodities to be distinguished from the specific commodities. In the following description, the specific commodity and/or the ordinary commodity may be referred to simply as the "commodity" in some cases describing at least one of the specific commodities and the ordinary commodities.

Figure 1:
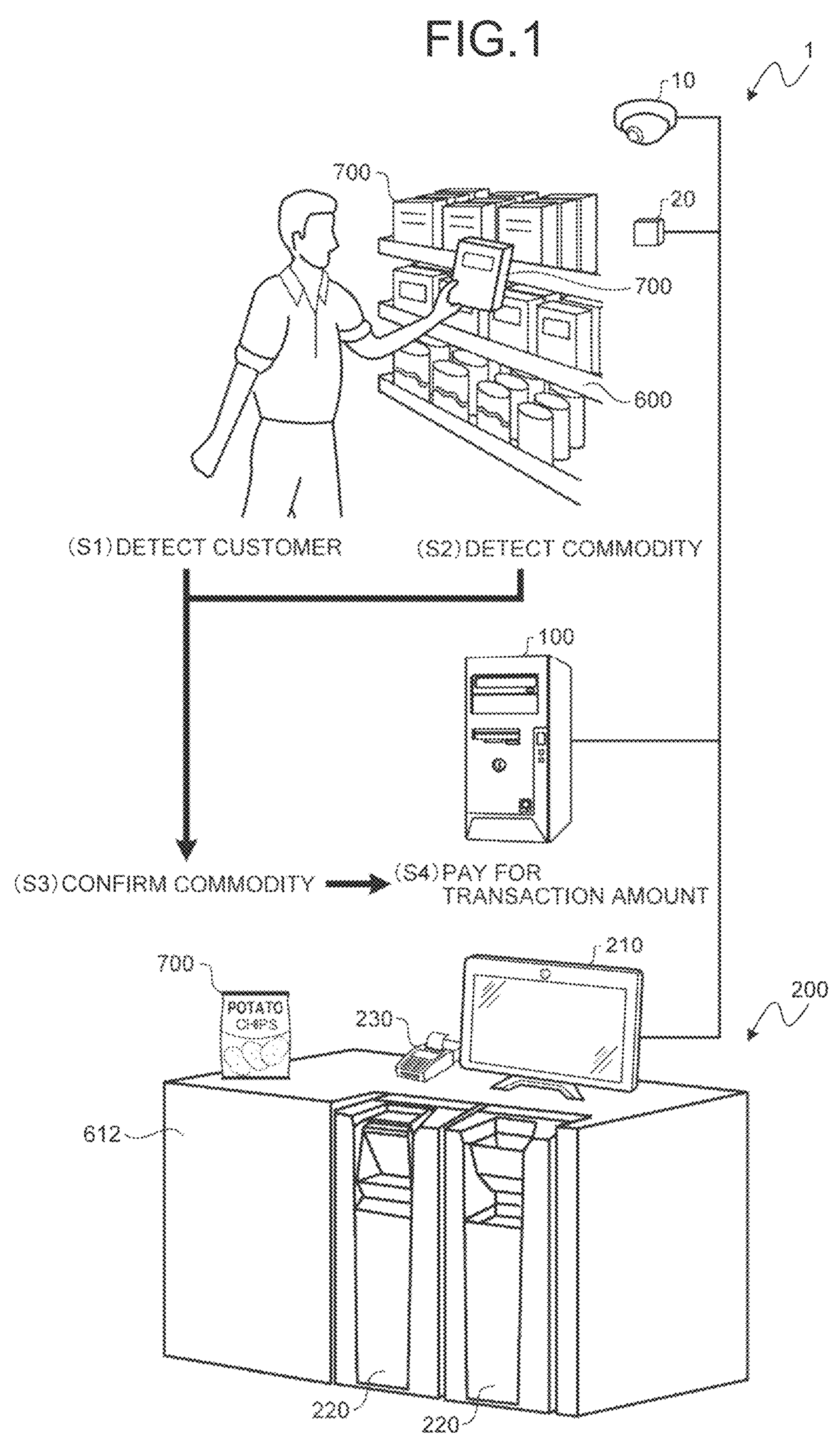
FIG. 1 illustrates an ordinary commodity sales method.

An ordinary commodity sales method in the commodity sales system will be described first and thereafter a specific commodity sales method will be described. FIG. 1 illustrates the ordinary commodity sales method. In the commodity sales system 1 of the unmanned store, commodities are sold by using a customer detection sensor 10, a commodity detection sensor 20, a management apparatus 100, and a settlement apparatus 200. The management apparatus 100 detects a customer by using the customer detection sensor 10 (S1). The management apparatus 100 detects a commodity that the customer purchases, by using the commodity detection sensor 20 (S2).

The customer detection sensor 10 is a sensor for detecting the position of the customer who moves around in the store. The customer detection sensor 10 may be a sensor that detects motion of the customer or motion of hands of the customer, in addition to the position of the customer. The type of the customer detection sensor 10 is not particularly limited. A sensor capable of detecting the customer by using an electromagnetic wave such as infrared light, visible light, laser, or ultrasonic wave can be used as the customer detection sensor 10. For example, a TOF (Time of Flight) sensor, a depth sensor, a LiDAR (Light Detection and Ranging) sensor, an infrared sensor, an ultrasonic sensor, an infrared camera, a visible light camera, or the like may be used as the customer detection sensor 10. One or more customer detection sensors 10 are disposed in association with commodity shelves 600 placed in the store, respectively, whereby the management apparatus 100 can detect the customer who looks around the commodity shelves 600, and track the customer who moves around in the store.

The commodity detection sensor 20 is a sensor for detecting the names and the number of commodities that the customer purchases. The type of the commodity detection sensor 20 is not particularly limited. A sensor capable of detecting presence/absence of a commodity, based on a change in weight at a place where the commodity is disposed, can be used as the commodity detection sensor 20. A sensor capable of detecting presence/absence of a commodity by irradiation or projection/reception of an electromagnetic wave such as infrared light, visible light, laser, or ultrasonic wave, can be used as the commodity detection sensor 20. A sensor that detects a commodity by a short-range wireless technology such as NFC (Near Field Communication) or RFID (Radio Frequency Identifier) using a tag attached to the commodity, can be used as the commodity detection sensor 20. For example, a weight detection type sensor that detects presence/absence of a commodity, based on a change in weight in a commodity shelf where a plurality of commodities are displayed, may be used as the commodity detection sensor 20. For another example, a camera type sensor that detects presence/absence of a commodity by analyzing a captured image may be used as the commodity detection sensor 20. One or more commodity detection sensors 20 are disposed in association with the respective commodities displayed in the commodity shelf, whereby the management apparatus 100 can detect the names and the number of commodities that the customer takes out from the commodity shelf and purchases. The name of each commodity is not limited to the actual name and may be identification information for identifying each commodity.

By using the customer detection sensor 10 and the commodity detection sensor 20, the management apparatus 100 detects each ordinary commodity 700 that the customer purchases, and manages the ordinary commodities 700 in association with the customer. The customer brings the ordinary commodities 700 to a checkout counter. The customer performs a settlement process of paying a purchased amount, which is a monetary amount for purchasing the ordinary commodities 700. The settlement process is performed by using the settlement apparatus 200 at the checkout counter. That is, the customer pays a transaction amount which is a monetary amount of transaction between the store and the customer, with the settlement apparatus 200. When the customer starts the settlement process, the management apparatus 100 has already detected the names and the number of the ordinary commodities 700 that the customer purchases, i.e., the ordinary commodities 700 being the object of transaction with the customer. In the management apparatus 100, a selling price is registered in association with the name of each ordinary commodity 700 in advance. The management apparatus 100 can specify the selling prices of the ordinary commodities 700 respectively, based on the names of the commodities. The management apparatus 100 can calculate the transaction amount for the transaction with the customer, based on the number of the ordinary commodities 700 and the selling price specified from the names. The management apparatus 100 displays, on a screen of the settlement apparatus 200, the name and the number of each commodity 700 that the customer purchases. Also, the management apparatus 100 displays the transaction amount, on the screen. The management apparatus 100 detects each ordinary commodity 700 that the customer takes from the shelf 600, specifies the selling price of each ordinary commodity 700 and the number of ordinary commodities 700, and calculates the transaction amount for purchasing these ordinary commodities 700. Therefore, the customer can start the settlement process without performing an operation for inputting information on the ordinary commodities 700 into the settlement apparatus 200.

The customer checks the names and the number of the ordinary commodities 700, and the transaction amount, which are displayed on the screen of the settlement apparatus 200 (S3). The customer pays the transaction amount to end the transaction (S4). The settlement apparatus 200 includes an electronic payment device 230, so that the customer can pay the transaction amount by electronic payment. For example, the customer can use the electronic payment device 230 to pay the transaction amount by using a credit card, a debit card, electronic money, or the like. The customer causes the electronic payment device 230 to read information required for the electronic payment from an electronic payment medium such as a card or a smartphone, whereby the electronic payment is performed. The customer may pay the transaction amount by cash, using a cash handling apparatus 220 of the settlement apparatus 200. When the customer deposits cash into the cash handling apparatus 220, the cash handling apparatus 220 recognizes and counts the cash to calculate the deposited amount of money. If the deposited amount of money exceeds the transaction amount, the cash handling apparatus 220 dispenses change to be returned to the customer. Thus, using the commodity sales system 1, the customer can purchase the commodities in the unmanned store without performing store membership registration to use the store. In the commodity sales system 1, information acquired in the store for the transaction with the customer can be set to be deleted when the customer leaves the store, which will be described later. This makes the unmanned store easy to use for the customer who does not like disclosure of personal information.

Figure 2:
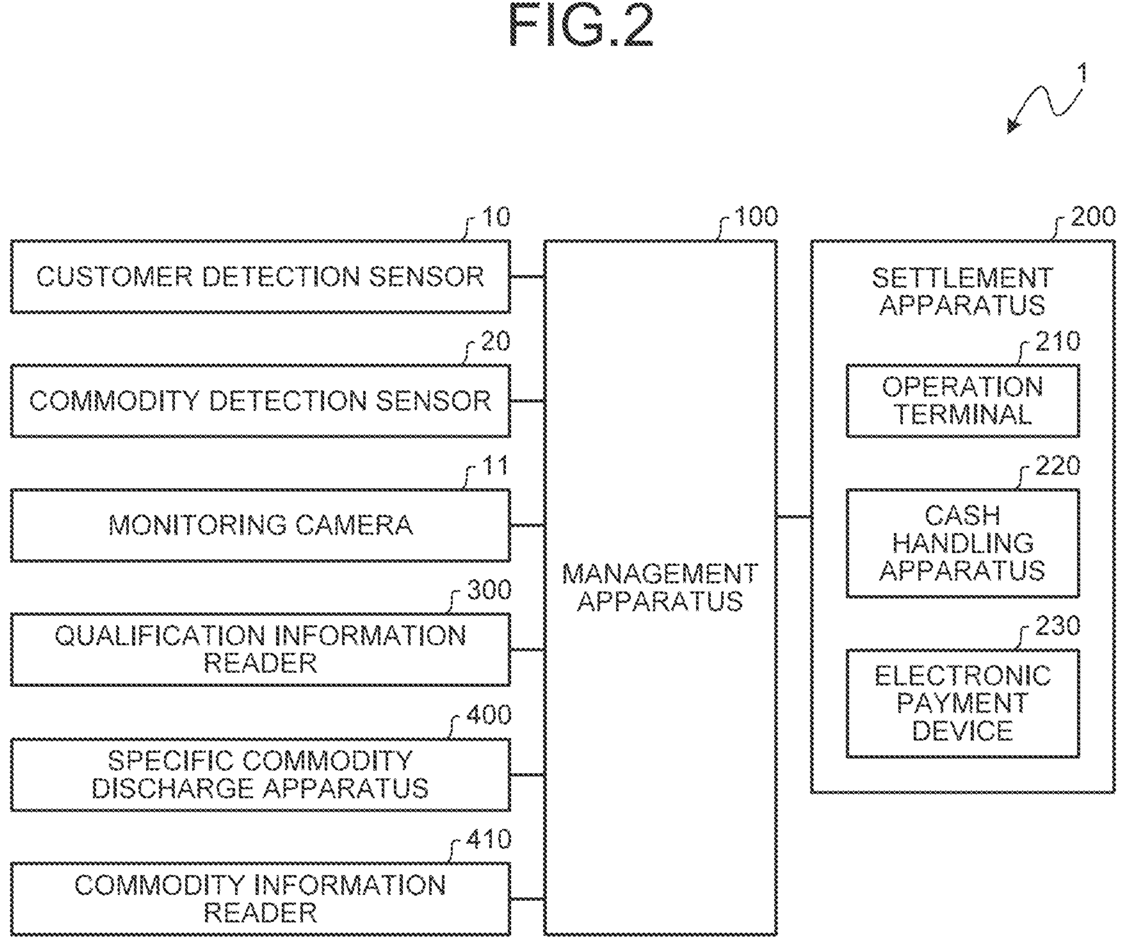
FIG. 2 is a block diagram showing an example of a configuration of a commodity sales system.

FIG. 2 is a block diagram showing an example of the configuration of the commodity sales system 1. The commodity sales system 1 includes a monitoring camera 11, a qualification information reader 300, a specific-commodity discharge apparatus 400, and a commodity information reader 410, in addition to the customer detection sensor 10, the commodity detection sensor 20, the management apparatus 100, and the settlement apparatus 200 shown in FIG. 1. The monitoring camera 11 is used for monitoring the behavior of the customer. The qualification information reader 300, the specific-commodity discharge apparatus 400, and the commodity information reader 410 are used for selling the specific commodities to the customer.

The management apparatus 100 includes processing circuitry 100, which will be discussed later with respect to FIG. 14. In some implementations, management apparatus 100 may include a computer device including an operation unit, a display unit, a control unit, and a memory. In another implementation, the management apparatus 100 may be composed of a plurality of computer devices, or may include a cloud server. The management apparatus 100 can control external devices that are communicably connected to the management apparatus 100. The external devices include the customer detection sensor 10, the commodity detection sensor 20, the monitoring camera 11, the settlement apparatus 200, the qualification information reader 300, the specific-commodity discharge apparatus 400, and the commodity information reader 410. These external devices being controlled by the management apparatus 100 realize the functions and the operations of the commodity sales system 1 described in the present embodiment.

The settlement apparatus 200 includes an operation terminal 210, the cash handling apparatus 220, and the electronic payment device 230. In an exemplary implementation, settlement apparatus 200 includes processing circuitry 100, which will be discussed later with respect to FIG. 14. The operation terminal 210 is configured to include a touch panel type liquid crystal display device, for example. The operation terminal 210 functions as an operation unit for inputting various kinds of information on the commodity transaction with the customer. The operation terminal 210 also functions as a display unit for displaying the various kinds of information on the commodity transaction. For example, when the customer starts the settlement process for the transaction, information on each object of the transaction such as the names, the number, and the prices of commodities are displayed on the screen of the operation terminal 210. The customer can perform correction, addition, deletion, and the like of the displayed information, by operating the operation terminal 210 according to need. The cash handling apparatus 220 can perform a process of depositing cash that the customer pays, and a process of dispensing change to be returned to the customer. When the customer desires electronic payment, the electronic payment device 230 acquires necessary information from an electronic payment medium possessed by the customer, and performs a process for the electronic payment.

In an exemplary implementation, qualification information reader 300 includes processing circuitry 100, which will be discussed later with respect to FIG. 14. The qualification information reader 300 reads information on a purchase qualification for a specific commodity from a qualification certifying matter possessed by the customer. The kind of the qualification certifying matter varies among regions or countries where stores exist, and therefore is not particularly limited. Hereinafter, the description will be continued with a qualification certificate used as an example of the qualification certifying matter. For example, in Japan, an official ID such as driver's license, health insurance card, individual number card, passport, etc., can be used as the qualification certificate. When the qualification information reader 300 captures an image of the qualification certificate by using a camera, a scanner, or the like, the management apparatus 100 performs character recognition or the like on the captured image to read matters stated in the qualification certificate, thereby confirming whether or not the customer has a purchase qualification. If the qualification certificate includes an IC chip in which qualification information is stored, the qualification information reader 300 reads the qualification information by using a reading device corresponding to the IC chip, and the management apparatus 100 confirms whether or not the customer has a purchase qualification, based on the qualification information. Instead of using the qualification information reader 300, the management apparatus 100 may inquire of an external device about information on the purchase qualification of the customer by using electronic payment information obtained by the electronic payment device 230, which will be described later.

In an exemplary implementation, specific-commodity discharge apparatus 400 includes processing circuitry 100, which will be discussed later with respect to FIG. 14. The specific-commodity discharge apparatus 400 is an apparatus for discharging the specific commodity purchased by the customer, to the customer. The commodity information reader 410 is a device for reading information on the specific commodity from a replacement of the specific commodity selected by the customer. The customer takes the replacement that is prepared for the specific commodity and including the information on the specific commodity, moves to a checkout counter 612 while carrying the replacement, and causes the commodity information reader 410 to read the information from the replacement, whereby the specific commodity is discharged from the specific-commodity discharge apparatus 400. Details on the method for selling the specific commodity will be described later.

Figure 3:
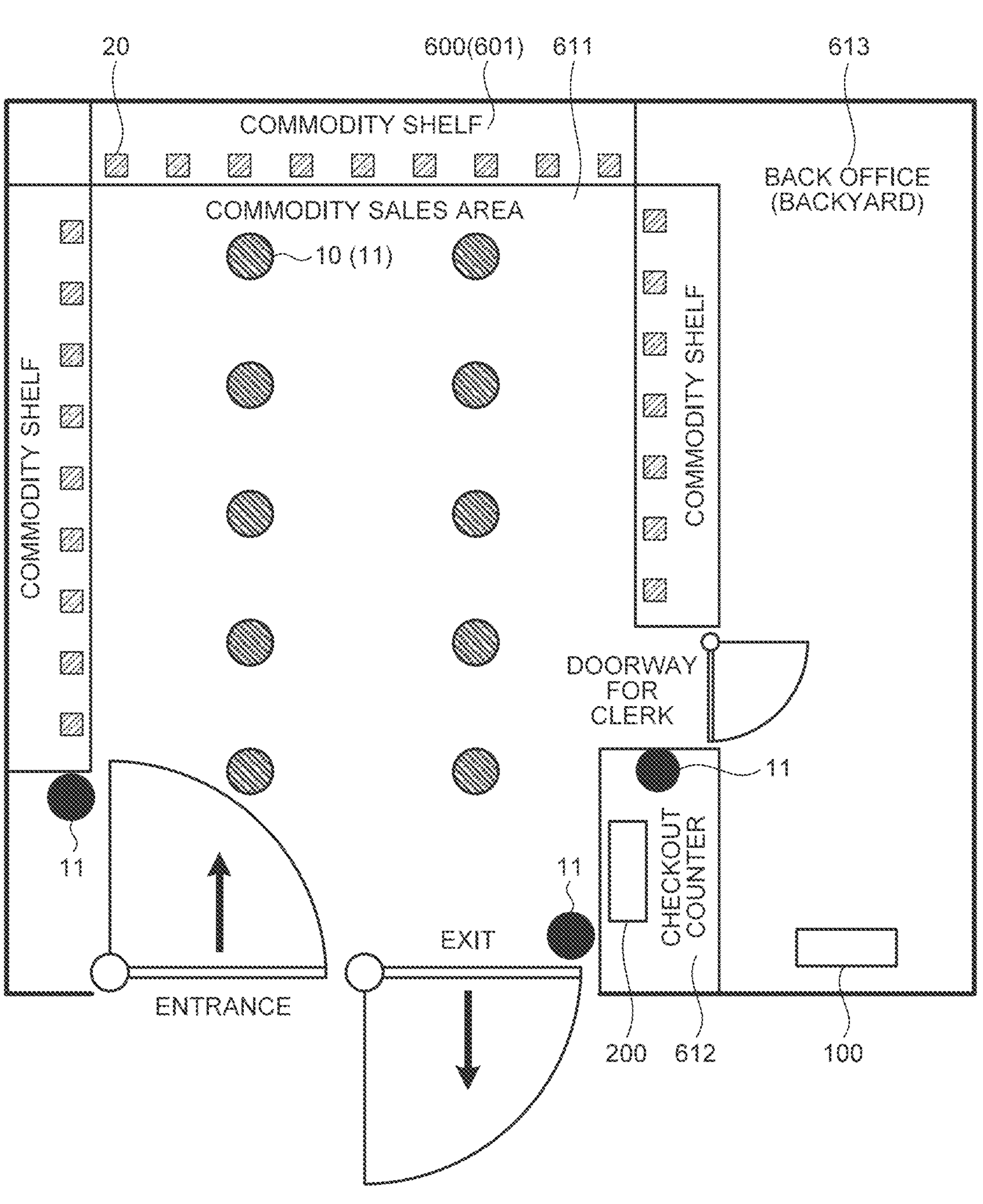
FIG. 3 illustrates an example of arrangement of devices in a store.

FIG. 3 illustrates an example of arrangement of the apparatuses and the devices in the store. FIG. 3 schematically shows the store viewed from above. For example, as shown in FIG. 3, the store is divided into a commodity sales area 611 where a plurality of commodity shelves 600 are installed, the checkout counter 612 where the settlement apparatus 200 is installed, and a back office 613 where the management apparatus 100 is installed. The clerk usually stands by in the back office 613. If the management apparatus 100 performs a notification process of instructing the clerk to serve the customer, the clerk checks the notification and serves the customer. For example, if the management apparatus 100 reproduces a notification sound while displaying the content of the notification on the display unit included in the management apparatus 100, the clerk checks the notification and serves the customer. The back office 613 is a place where commodities are not sold, such as a warehouse where commodities are stored or a place where the clerk stands by. In Japanese distribution stores, the back office is sometimes called a backyard.

A plurality of customer detection sensors 10 are installed in the commodity sales area 611 so that the management apparatus 100 can detect the customer who has entered the store from the entrance, and track the customer who is shopping while moving in the store. The number and the installation spots of the customer detection sensors 10 are not particularly limited. The number and the installation spots of the customer detection sensors 10 in the commodity sales area 611 are determined based on the type of the customer detection sensors 10. For example, a camera type customer detection sensor 10 that detects the customer by analyzing the captured image may be installed on the ceiling of the commodity sales area 611. The customer detection sensors 10 may be installed on the walls or the floor of the store, or may be installed on the commodity shelves 600.

A plurality of commodity detection sensors 20 are installed in the commodity sales area 611 so that the management apparatus 100 can detect the names and the number of commodities that the customer takes out from the commodity shelves 600 and purchases. The number and the installation spots of the commodity detection sensors 20 are not particularly limited. The number and the installation spots of the commodity detection sensors 20 in the commodity sales area 611 are determined based on the type of the commodity detection sensors 20. For example, a weight detection type commodity detection sensor 20 that detects a commodity based on a change in weight may be installed on a commodity shelf 600. A plurality of weight detection type commodity detection sensors 20 may be installed in association with the respective commodity shelves 600 or the respective commodities displayed in the commodity shelves 600. For another example, a camera type commodity detection sensor 20 that detects commodities by analyzing a captured image may be installed in association with each commodity shelf 600. The installation spot of the camera type commodity detection sensor 20 may be the ceiling, the wall, the floor, or the commodity shelf 600. A plurality of camera type commodity detection sensors 20 may be installed in association with one commodity shelf 600.

The monitoring camera 11 that is a monitoring sensor for monitoring the behavior of the customer in the store is installed in the commodity sales area 611. The number and the installation spots of monitoring cameras 11 are not particularly limited. For example, the monitoring cameras 11 are installed so as to capture images of the customer who enters the store from the entrance, the customer at the checkout counter 612, and the customer who leaves the store through the exit. When the customer detection sensors 10 are visible light cameras, the customer detection sensors 10 may also be used as the monitoring cameras 11.

Figure 4:
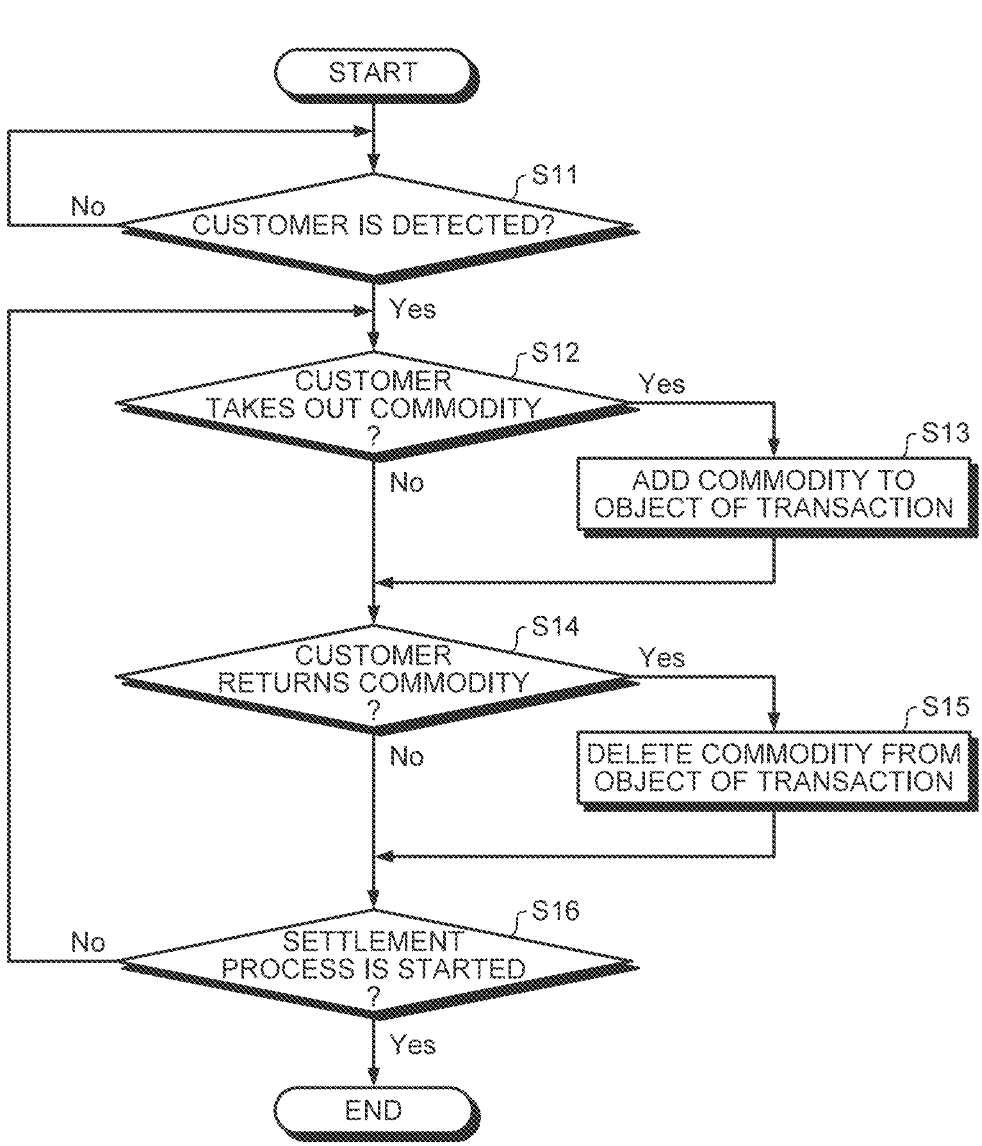
FIG. 4 is a flowchart illustrating a method performed by a management apparatus to detect a commodity purchased by a customer.

FIG. 4 is a flowchart illustrating a method performed by the management apparatus 100 to detect a commodity purchased by the customer. The management apparatus 100 is monitoring presence/absence of customers visiting the store by using the customer detection sensors 10 and the monitoring cameras 11 (step S11; No). Upon detecting a customer (step S11; Yes), the management apparatus 100 starts to track the customer by using the customer detection sensors 10. The management apparatus 100 continues to detect the customer, who has entered the store from the entrance, by using at least one of the customer detection sensors 10, whereby the management apparatus 100 can continue to track the customer who is moving around in the store until the customer leaves the store. Even when there are a plurality of customers in the store, the management apparatus 100 can track each customer. The management apparatus 100 can perform a settlement process by specifying commodities purchased by each customer while tracking each customer. Since the same process is performed for each customer, hereinafter, the description will be continued for one customer.

The management apparatus 100 continuously monitors the motion of the customer purchasing commodities until the customer starts the settlement process at the checkout counter 612 (step S12; No, step S14; No, step S16; No).

When the customer takes out a commodity from a commodity shelf (step S12; Yes), the management apparatus 100 detects the commodity by using the commodity detection sensor 20. The management apparatus 100 adds the taken out commodity to the object of transaction with the customer (step S13). When the customer returns the commodity to the commodity shelf (step S14; Yes), the management apparatus 100 detects the commodity by using the commodity detection sensor 20. The management apparatus 100 deletes the returned commodity from the object of transaction with the customer (step S15). That is, the management apparatus 100 detects, with the commodity detection sensor 20, the commodity that will be purchased by the customer while tracking the customer with the customer detection sensor 10, and manages the detected commodity in association with the customer.

For example, the management apparatus 100 analyzes an image captured by the camera type commodity detection sensor 20 to specify the names and the number of commodities that the customer has taken out from the commodity shelf, and the names and the number of commodities that the customer has returned to the commodity shelf. For another example, the management apparatus 100 detects the display position of the taken-out commodity and the display position of the returned commodity in the commodity shelf, by using the commodity detection sensor 20 that may detect the display positions based on a change in weight, a change in electromagnetic wave, a change in communication state with a tag attached to the commodity, or the like. In the management apparatus 100, the display positions of the respective commodities are registered in associated with information such as the names of the commodities in advance, whereby the management apparatus 100 can specify the names and the number of the commodities taken out from the commodity shelf and the names and the numbers of the commodities returned to the commodity shelf. Additionally, since the selling prices associated with the names of the commodities are also registered in the management apparatus 100 in advance, the management apparatus 100 can specify the selling prices of the respective commodities.

When the customer moves to the checkout counter 612 and starts the settlement process (step S16; Yes), the management apparatus 100 ends the detection of commodities that will be purchased by the customer, and starts the settlement process.

The settlement process is started based on the names and the number of the commodities that the management apparatus 100 has detected and added to the object of transaction with the customer. The names and the number of the commodities that the management apparatus 100 has associated with the customer are displayed on the display unit of the operation terminal 210 included in the settlement apparatus 200. The customer checks the transaction screen displayed on the operation terminal 210. When there is any error in the names and the number of the commodities, the customer can change the names and/or the numbers of the commodities by operating the operation terminal 210. However, if the management apparatus 100 has detected a suspicious behavior of the customer, the change operation on the commodities by the customer is restricted.

FIG. 5 is a flowchart illustrating the operation restriction on the customer in the settlement process. The management apparatus 100 can detect the motion of the customer from the image captured by the monitoring camera 11. For example, a customer and/or a motion of the customer may be detected from a difference between captured images. Since the technology of detecting a person from a captured image and detecting a motion of the person from a sequence of still images or a moving image has been conventionally known, detailed description thereof will be omitted. The subject detection and the motion detection may not necessarily be performed by image analysis based on infrared images or visible light images, and may be performed by using depth images, etc., or using machine learning or AI (Artificial Intelligence) technology.

The management apparatus 100 determines whether or not the detected behavior of the customer corresponds to an attention-required motion (step S21). Upon detecting an attention-required motion (step S21; Yes), the management apparatus 100 adds the customer to confirmation targets (step S22). Even when no attention-required motion is detected (step S21; No), the management apparatus 100 continues to monitor the customer until the customer starts the settlement process (step S23; No).

The attention-required motion includes a motion by which the customer is suspected of shoplifting a commodity. For example, a motion such that the customer puts a commodity in clothes or a bag before finishing the settlement process is detected as the attention-required motion. Even when a motion of putting a commodity in clothes or a bag is not detected, a motion of putting a hand in clothes or a bag may be detected as the attention-required motion. In addition, a motion of frequently looking around, a motion of being conscious of a camera, a motion of hiding a commodity in hand by the body, etc., are detected as attention-required motions. Moreover, if the customer stays in the store for an unnecessarily long time, or stays for a short time and leaves without buying anything, such a motion may be also detected as the attention-required motion.

The attention-required motion includes a motion that causes the management apparatus 100 not to correctly detect the commodity purchased by the customer. For example, when the camera type commodity detection sensor 20 is used, if the arms of two customers, who try to take a commodity from a commodity shelf, intersect each other, the management apparatus 100 may not exactly determine which customer took the commodity. The management apparatus 100 detects such a motion of the customer as the attention-required motion. The management apparatus 100 performs a notification process of notifying the clerk of the detection result, whereby the clerk can confirm the purchase commodities when the customer performs the settlement process.

The attention-required motions to be detected are registered in the management apparatus 100 in advance, and the management apparatus 100 detects the registered motions as the attention-required motions. The management apparatus 100 may use AI technology. For example, the management apparatus 10 may learn the behaviors of customers by using teacher data including predetermined behavior information to detect attention-required motions, and perform behavior detection based on the learning result. For another example, the management apparatus 100 may learn the normal motions of customers in the store, and detect behaviors departing from the normal motions, as the attention-required motions.

When the customer moves to the checkout counter 612 and starts the settlement process (step S23; Yes), the management apparatus 100 determines whether or not the customer is a confirmation target (step S24). If the customer is a confirmation target (step S24; Yes), the operation that the customer can perform with the settlement apparatus 200 is restricted. The commodities, which have been detected by the management apparatus 100 and will be purchased by the customer, are displayed on the operation terminal 210 of the settlement apparatus 200. The customer who is the confirmation target cannot change the names and the number of the commodities displayed on the operation terminal 210 of the settlement apparatus 200, while the customer who is not a confirmation target can change the names and the number of the commodities by operating the operation terminal 210.

When the customer who is the confirmation target desires to change the names and/or the number of the commodities (step S25; Yes), the management apparatus 100 performs a notification process of notifying the clerk of this fact (step S26). The management apparatus 100 changes the transaction screen depending on whether or not the customer is the confirmation target. The management apparatus 100 performs notification process to the clerk when the customer who is the confirmation target presses a clerk call button on the transaction screen. For example, a button for changing information on commodity is displayed on the transaction screen when the customer is not the confirmation target. On the other hand, when the customer is the confirmation target, the clerk call button is displayed on the transaction screen, instead of the change button. The call button is displayed with a message instructing the customer to press the button if he/she desires to change information on the commodity. Alternatively, the same transaction screen may be displayed on the operation terminal 210 regardless of whether or not the customer is the confirmation target. In this case, only when the customer who is the confirmation target has performed an operation on the transaction screen to change information on the commodity, the management apparatus 100 may perform the notification process to the clerk without accepting the change operation.

When the management apparatus 100 performs the notification process, the notification content includes the reason of the notification to the clerk and an instruction to the clerk. The method for performing the notification process by the management apparatus 100 is not particularly limited. For example, the management apparatus 100 may reproduce a predetermined notification sound while displaying the notification content on the screen. A warning device such as a light may be installed in the back office 613, and the management apparatus 100 may turn on or flicker the light when performing the notification. The management apparatus 100 may transmit the notification to a mobile communication terminal possessed by the clerk.

In a case where the notification process has been performed because the customer who desires to change information on the commodity is the confirmation target, the clerk is notified that the customer desires to change the commodity, that the customer is the confirmation target. The clerk may be also notified that the reason why the customer is the confirmation target. The clerk may also be notified that it is necessary to confirm whether there is no problem with the commodities purchased by the customer and/or the content of change desired by the customer.

Even when the customer who is the confirmation target does not desire to change the commodity (step S25; No), if the management apparatus 100 detects abnormality (step S27; Yes), the notification process to the clerk is performed (step S26). Even when the customer is not the confirmation target (step S24; No), if the management apparatus 100 detects abnormality (step S27; Yes), the notification process to the clerk is performed (step S26).

The notification process is performed when the names and the number of the commodities that the customer purchases, i.e., the commodities displayed on the operation terminal 210, do not match the names and the number of the commodities captured by the monitoring camera 11 at the checkout counter 612. For example, the notification process is performed when the number of plastic beverage bottles that the customer purchases is one although two plastic beverage bottles carried by the customer are captured by the monitoring camera 11 at the checkout counter 612.

The customer who is not the confirmation target is allowed to perform an operation of changing the names and the number of the commodities displayed on the operation terminal 210. However, if the names and the number of the commodities after the change operation do not match the names and the number of the commodities captured by the monitoring camera 11 at the checkout counter 612, the notification is performed. For example, the notification process is performed when the customer has excluded plastic beverage bottles from the settlement target or reduced the number of plastic beverage bottles to one although two plastic beverage bottles carried by the customer are captured by the monitoring camera 11 at the checkout counter 612.

After the notification process to the clerk, the clerk having received the notification moves to the checkout counter 612. The clerk can confirm or change the commodities that the customer purchases, according to need. When the customer who is the confirmation target desires to change information on the commodity, the clerk having received the notification confirms the commodity and performs a predetermined operation with the operation terminal 210, whereby the management apparatus 100 accepts a commodity change operation performed by the customer. If the management apparatus 100 detects an abnormality, the clerk performs confirmation work, and the settlement process is advanced under surveillance of the clerk, for example.

Monitoring at the checkout counter 612 by the management apparatus 100 is continued until the settlement process is completed (step S27; No, step S28; No). Upon completing the settlement process (step S28; Yes), the customer can leave the store with the purchased commodities.

The commodity sales system 1 may be configured such that the notification process to the clerk is performed even in cases other than commodity change and abnormality detection. For example, when the management apparatus 100 detects a suspicious behavior of the customer, the notification process may be performed without waiting for the start of the settlement process. When a specific commodity is added to the object of transaction with the customer, the notification process may be performed at the start of the settlement process of this customer. If the management apparatus 100 has detected a behavior of the customer, by which the commodity that the customer purchases may not be correctly detected, the notification process may be performed at the start of the settlement process of this customer. Upon receiving the notification, the clerk can confirm the commodities that the customer purchases, and/or prepare the specific commodity to be handed over to the customer, according to need.

Next, a method for selling a specific commodity adopted in the commodity sales system 1 will be described. Hereinafter, three examples of the method for selling the specific commodity will be described mainly for differences from the method for selling the ordinary commodity 700. In the three examples, duplicate descriptions are omitted by assigning the same reference numerals to the same components, and differences are mainly described.

First Specific-Commodity Sales Method

Figure 6:
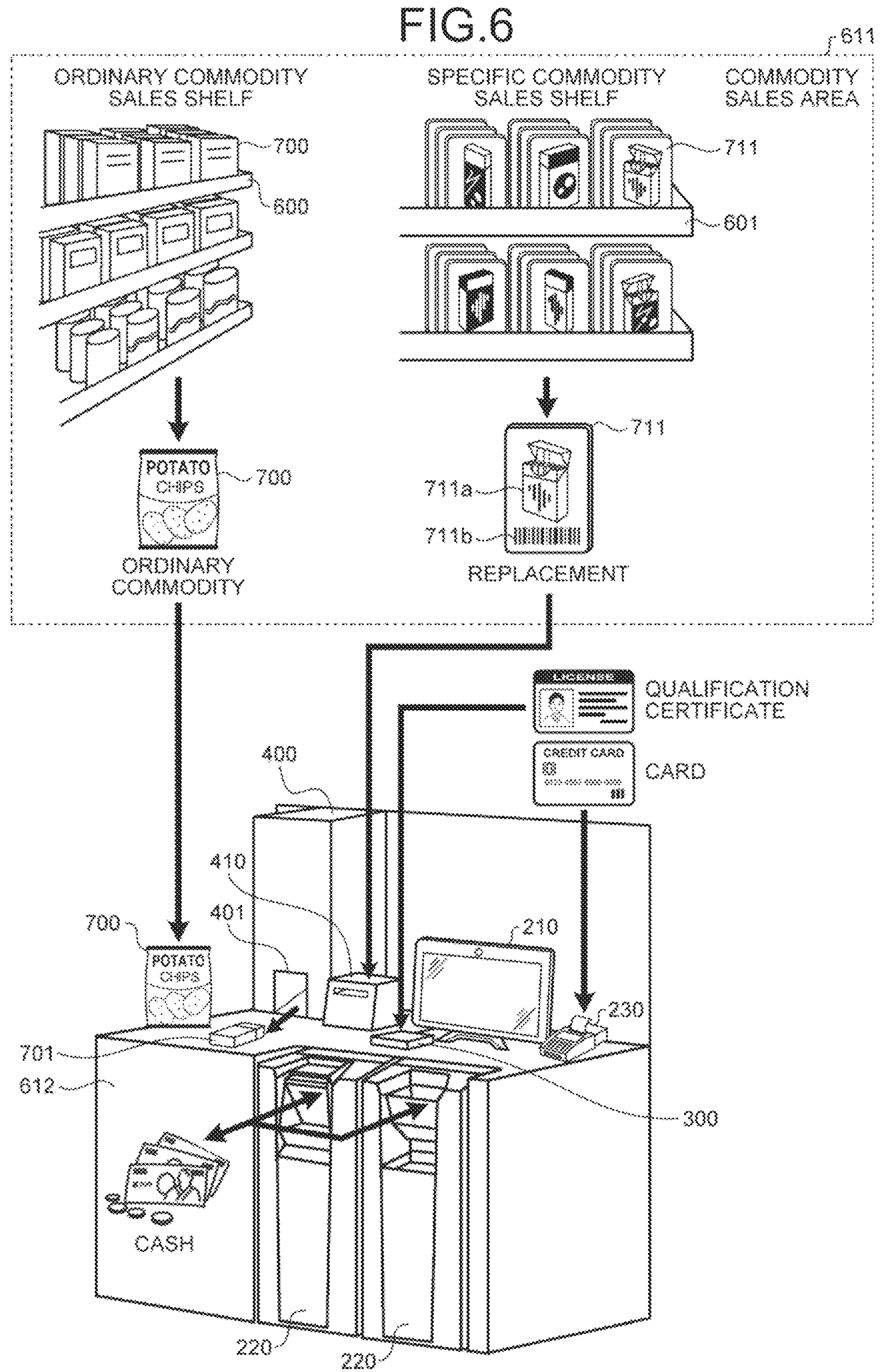
FIG. 6 illustrates a first sales method for specific commodities.

FIG. 6 illustrates a first sales method for specific commodities 701. As shown in FIG. 6, in addition to a commodity shelf 600 in which ordinary commodities 700 are displayed, a commodity shelf 601 for the specific commodities 701 is installed in the commodity sales area 611. A display stand including the shelf 600 for the ordinary commodities 700 may be separated from a display stand including the shelf 601 for the specific commodities 701. One display stand may include both the shelf 600 for the ordinary commodities 700 and the shelf 601 for the specific commodities 701. The ordinary commodities 700 are displayed on a part of the commodity shelf 600, and another part of the same shelf 600 may be used for displaying the specific commodities 701 as the commodity shelf 601.

In the commodity shelf 600 for the ordinary commodities 700, actual ordinary commodities 700 are displayed. Meanwhile, in the commodity shelf 601 for the specific commodities 701, not actual specific commodities 701 but replacements 711 of the specific commodities 701 are displayed. For example, as shown in FIG. 6, a card on which commodity information 711*a* and a graphic code 711*b* of the specific commodity 701 is printed is used as the replacement 711. The commodity information 711*a* includes a name, and a price of the specific commodity 701. The graphic code 711*b* is obtained by encoding information including the name of the specific commodity 701. The replacement 711 may be a card type storage medium in which information including the name of the specific commodity 701 is stored.

The customer who purchases a specific commodity 701 takes out the replacement 711 of the specific commodity 701 from the commodity shelf 601, and moves to the checkout counter 612. After the customer arrived at the checkout counter 612, the object of transaction with the customer, i.e., the commodities that will be purchased by the customer, which have been detected by the management apparatus 100, are displayed on the transaction screen of the operation terminal 210, and the settlement process is started, as described above. During the settlement process, a process of confirming whether the customer has a purchase qualification for the specific commodity 701 is performed.

Figure 7:
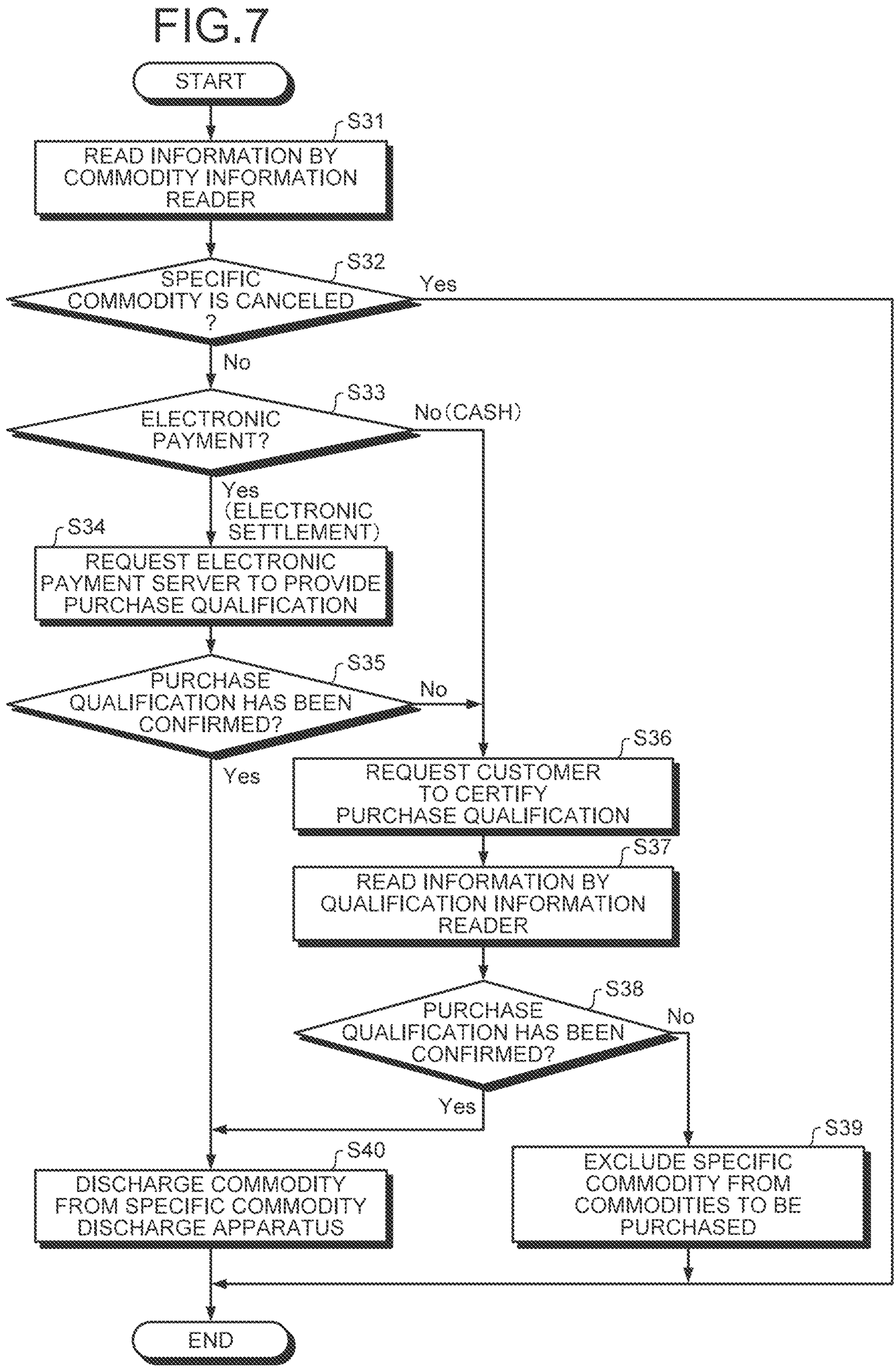
FIG. 7 is a flowchart illustrating an example of a process of confirming a purchase qualification of the customer.

FIG. 7 is a flowchart illustrating the process of confirming a purchase qualification of the customer. The customer causes the commodity information reader 410 shown in FIG. 6 to read the card type replacement 711 brought from the commodity shelf 601 (step S31). For example, information that instructs the customer to use the commodity information reader 410 to read the information on the replacement 711, is displayed on the transaction screen of the operation terminal 210. The customer inserts the replacement 711 into an insertion port of the commodity information reader 410. The commodity information reader 410 takes the inserted replacement 711 into inside the commodity information reader 410 to read the graphic code 711*b* printed on the replacement 711. The commodity information reader 410 outputs the graphic code 711*b* to the management apparatus 100. The replacement 711 is collected and stored in the commodity information reader 410 for re-using. Upon receiving the graphic code 711*b*, the management apparatus 100 recognizes the specific commodity 701 based on the information included in the graphic code 711*b*, and add the specific commodity 701 to the commodities that the customer purchases. When the replacement 711 is a card type storage medium, the commodity information reader 410 reads out information including the name of the specific commodity 701 stored in the storage medium, and inputs the read information into the management apparatus 100. Then, the management apparatus 100 adds the specific commodity 701 to the commodities to be purchased by the customer. The specific commodity 701 corresponding to the replacement 711 is added to the object of transaction with the customer.

The management apparatus 100 displays the information on the specific commodity 701 added to the commodities that the customer purchases, based on the information acquired from the replacement 711, on the transaction screen of the operation terminal 210. On the screen, the names, prices, and the numbers of the ordinary commodity 700 and the specific commodity 701 that the customer purchases are displayed. The transaction amount for purchasing all the commodities is also displayed on the screen. The customer can cancel purchase of the specific commodity 701 by operating the operation terminal 210 (step S32; Yes). When the customer has canceled purchase of the specific commodity 701, the process is ended without performing the process of confirming the purchase qualification, and the settlement process for the ordinary commodity 700 is executed as described with reference to FIG. 1. In this case, during the time from entering the store to leaving the store, the customer does not touch the actual specific commodity 701, and only the process using the replacement 711 is performed until the transaction with the customer is ended.

When the customer purchases the specific commodity 701 (step S32; No), the process of confirming whether the customer has a purchase qualification for the specific commodity 701 is started. If the customer selects electronic payment to pay for the purchased commodities, i.e., the transaction amount (step S33; Yes), the customer uses the electronic payment device 230 shown in FIG. 6 to input electronic payment information from an electronic payment medium of the customer. The management apparatus 100 transmits the electronic payment information acquired by the electronic payment device 230 to an electronic payment server conforming to the electronic payment that the customer uses, thereby requesting the electronic payment. Also, the management apparatus 100 requests the electronic payment server to provide information on the purchase qualification of the customer (FIG. 7, step S34). If the specific commodity 701 is an age-limited commodity, the management apparatus 100 requests the electronic payment server to provide information on the age of the customer. The management apparatus 100 can perform the process of requesting the external server having the information on the purchase qualification for the specific commodity 701 to provide the information on the customer.

When the management apparatus 100 has acquired the age information of the customer from the electronic payment server and confirmed that the customer has the purchase qualification for the specific commodity 701 (step S35; Yes), the management apparatus 100 controls the specific-commodity discharge apparatus 400 to discharge the specific commodity 701 purchased by the customer, from a discharge port 401 as shown in FIG. 6 (FIG. 7, step S40). The actual specific commodity 701 is discharged from the specific-commodity discharge apparatus 400 after the customer has paid the transaction amount. Details of the specific-commodity discharge apparatus 400 will be described later.

If the customer selects payment by cash (step S33; No), the management apparatus 100 requests the customer to show information on the purchase qualification to certify that the customer has the purchase qualification (step S36). Also, if information on the purchase qualification of the customer cannot be obtained from the electronic payment server (step S35; No), the management apparatus 100 requests the customer to show the information on the purchase qualification (step S36).

The management apparatus 100 displays, on the transaction screen of the operation terminal 210, information that instructs the customer to cause the qualification information reader 300 shown in FIG. 6 to read a qualification certificate with which the purchase qualification for the specific commodity 701 can be confirmed. The customer causes the qualification information reader 300 to read the qualification certificate such as a driver's license (FIG. 7, step S37). Based on the information read by the qualification information reader 300, the management apparatus 100 confirms whether the customer has the purchase qualification for the specific commodity 701. If the specific commodity 701 is an age-limited commodity, the management apparatus 100 confirms whether the customer has the purchase qualification by specifying the age of the customer from matters stated in the qualification certificate, information acquired from an IC chip of the qualification certificate, or the like.

If the purchase qualification of the customer cannot be confirmed (step S38; No), the management apparatus 100 excludes the specific commodity 701 from the commodities that the customer purchases (step S39). The management apparatus 100 displays, on the transaction screen of the operation terminal 210, information indicating that the store cannot sell the specific commodity 701 to the customer because the purchase qualification cannot be confirmed. In this case, the specific commodity 701 is not discharged from the specific-commodity discharge apparatus 400. Thereafter, if the customer purchases any ordinary commodity 700, the settlement process for the ordinary commodity 700 is performed. The customer pays the transaction amount for the ordinary commodity 700, and leaves the store with the purchased ordinary commodity 700. In the case where the customer who tries to purchase only the specific commodity 701 cannot certify the purchase qualification, since the replacement 711 has already been collected into the commodity information reader 410, the customer leaves the store empty-handed. In these cases, the customer does not touch the actual specific commodity 701 during the time from entering the store to leaving the store. The replacement 711 may not be collected and may be handled in another method. For example, if the replacement 711 is a paper medium or the like, the replacement 711 may be thrown and discarded into a trash box disposed near the specific-commodity discharge apparatus 400.

When it has been confirmed that the customer has the purchase qualification for the specific commodity 701 by using the qualification information reader 300 (step S38; Yes), the management apparatus 100 controls the specific-commodity discharge apparatus 400 to discharge the specific commodity 701 purchased by the customer, from the discharge port 401 (step S40). If the customer purchases the ordinary commodity 700 in addition to the specific commodity 701, the process of paying for the ordinary commodity 700 and the specific commodity 701 is performed. If the customer does not purchase any ordinary commodity 700, the process of paying for the specific commodity 701 is performed. The actual specific commodity 701 may be discharged from the specific-commodity discharge apparatus 400 after the customer has finished payment for the transaction amount.

In the case of purchasing the specific commodity 701, the customer can pay the transaction amount by electronic payment or by cash in the same way as that of purchasing the ordinary commodity 700 described above. If the customer selects electronic payment, the management apparatus 100 acquires the settlement information by using the electronic payment device 230 as shown in FIG. 6, and the electronic payment is performed by the electronic payment server based on the settlement information. If the customer selects payment by cash, the customer deposits cash into the cash handling apparatus 220 to pay the transaction amount, and receives change dispensed from the cash handling apparatus 220 according to need.

After the payment of the purchased amount by the customer, the actual specific commodity 701 is discharged from the specific-commodity discharge apparatus 400, whereby the transaction with the customer is ended. The customer leaves the store with the purchased commodities including the specific commodity 701. It is preferable that the actual specific commodity 701 is discharged from the specific-commodity discharge apparatus 400 to the customer after completing the payment of the transaction amount by the customer. However, the timing of handing over the actual specific commodity 701 to the customer is not particularly limited as long as it is after completing the confirmation of the purchase qualification of the customer. The payment of the transaction amount may be performed after the actual specific commodity 701 has been handed over to the customer.

Figure 8:
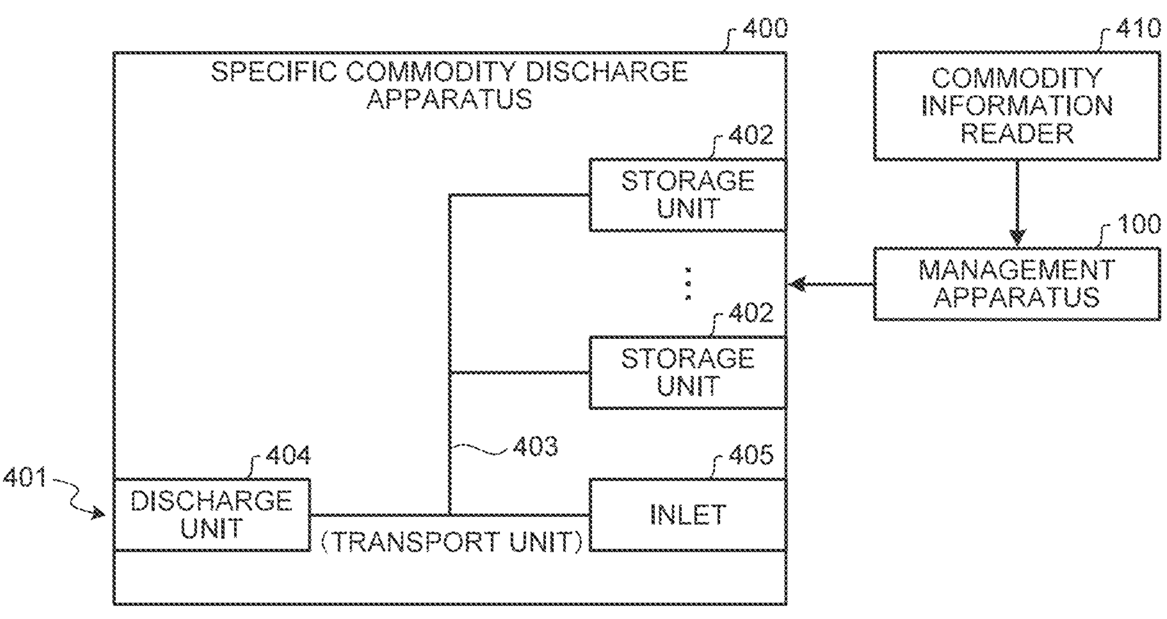
FIG. 8 illustrates an example of a specific-commodity discharge apparatus.

FIG. 8 illustrates an example of the specific-commodity discharge apparatus 400. The specific-commodity discharge apparatus 400 includes a discharge port 401, a plurality of storage units 402, a transport unit 403, and a discharge unit 404. The specific commodities 701 to be sold in the store are stored for each commodity type in the storage units 402. The transport unit 403 can take out the specific commodities 701 one by one from each storage unit 402, and transport the commodity 701 to the discharge unit 404. The discharge unit 404 receives the specific commodity 701 transported by the transport unit 403, and discharges the commodity 701 from the discharge port 401 to the outside of the specific-commodity discharge apparatus 400. As described above, the management apparatus 100 controls the specific-commodity discharge apparatus 400 to discharge from the discharge port 401 the specific commodity 701 corresponding to the replacement 711 selected by the customer, on the condition that it has been confirmed that the customer has the purchase qualification for the specific commodity 701.

For example, as shown in FIG. 6, the specific-commodity discharge apparatus 400 having the discharge port 401 at the front surface thereof is installed such that the back surface thereof abuts a wall that separates the checkout counter 612 from the back office 613 of the store. On the back surface of the specific-commodity discharge apparatus 400, a replenishment port for replenishing the storage units 402 with specific commodities 701 is provided. The replenishment port may be exposed to the back office 613 side. The clerk in the back office 613 can replenish the storage units 402 of the specific-commodity discharge apparatus 400 with specific commodities 701 from the replenishment port.

As shown in FIG. 8, the specific-commodity discharge apparatus 400 may have an inlet 405 on the back surface side. When the customer has purchased a specific commodity 701 that is not stored in the storage units 402, the management apparatus 100 performs a notification process of instructing the clerk in the back office 613 to bring the specific commodity 701 to the customer. The clerk is notified of information including the specific commodity 701 purchased by the customer and an instruction to put the specific commodity 701 into the inlet 405. The clerk puts the specific commodity 701, which has been kept in the back office 613, into the inlet 405. Then, the transport unit 403 transports the specific commodity 701 from the inlet 405 to the discharge unit 404, and the specific commodity 701 is discharged from the discharge port 401.

FIG. 8 is an example, and does not limit the configuration of the specific-commodity discharge apparatus 400. The configuration of the specific-commodity discharge apparatus 400 is not particularly limited as long as the customer can receive the actual specific commodity 701 that the customer purchased. For example, a door that is usually locked and does not open may be disposed at the front surface of the specific-commodity discharge apparatus 400 so as to correspond to each storage unit 402. The management apparatus 100 may unlock the door corresponding to the specific commodity 701 purchased by the customer so that the customer can open the door and take out the specific commodity 701 from the storage unit 402. The specific-commodity discharge apparatus 400 may include the commodity information reader 410 shown in FIG. 6.

The management apparatus 100 may perform a notification process of notifying the clerk of the specific commodity 701 purchased by the customer, and the clerk, upon receiving the notification, may bring by hand the specific commodity 701 having been kept in the back office 613 to the customer. Also, as for confirmation of purchase qualification, the management apparatus 100 may perform a notification process of notifying the clerk that purchase qualification needs to be confirmed, and the clerk, upon receiving the notification, may visually confirm the qualification certificate of the customer. In this case, the settlement process may be performed as described above after the clerk, who has confirmed that the customer has the purchase qualification, performs a predetermined operation with the management apparatus 100 to indicate that the purchase qualification has been confirmed.

The management apparatus 100 may not necessarily be configured to recognize that the customer will purchase the specific commodity 701, based on the replacement 711 inserted in the commodity information reader 410 by the customer. As in the case of the ordinary commodity 700, the management apparatus 100 may recognize that the customer will purchase the specific commodity 701 by detecting, with the commodity detection sensor 20, the replacement 711 taken out from the commodity shelf 601 by the customer. For example, if the commodity detection sensor 20 is a sensor that detects a commodity from a captured image, the management apparatus 100 may detect the specific commodity 701 that the customer purchases, based on the commodity information 711*a* or the graphic code 711*b* of the replacement 711 in the captured image. In this case, the management apparatus 100 can skip step S31 shown in FIG. 7 and start the process from step S32.

The replacement 711 may not necessarily have a card shape, and may have a three-dimensional shape. If the commodity detection sensor 20 is a sensor that detects a commodity based on the weight of the commodity, a box or the like whose weight can be detected by the commodity detection sensor 20 may be displayed as the replacement 711 in the commodity shelf 601. For example, a box on which the commodity information 711*a* and the graphic code 711*b* shown in FIG. 6 are printed may be used. An empty box of cigarettes being the specific commodity 701, or an empty can or an empty bottle of an alcohol beverage may be used as the replacement 711. A box simulating cigarettes, or a can or a bottle simulating an alcohol beverage may be used as the replacement 711. A dummy box having an appearance resembling the specific commodity 701 may be used as the replacement 711. In this case, the commodity information reader 410 may be configured to read the graphic code 711*b* from the three-dimensional replacement 711, and a collection box or the like for collecting the replacement 711 may be disposed at the checkout counter 612 to collect the replacement 711.

As described above, in the commodity sales system 1, the customer can purchase the specific commodity 701 without operations for the store membership registration. In the commodity shelf 601 for selling the specific commodities 701, the replacements 711 are displayed instead of the actual specific commodities 701. The customer who desires to purchase the specific commodity 701 moves to the checkout counter 612 while carrying the replacement 711. At the checkout counter 612, the customer certifies that he/she has the purchase qualification for the specific commodity 701, whereby the customer can receive the actual specific commodity 701.

When the customer cancels purchase of the specific commodity 701 during shopping, the customer only needs to return the replacement 711 to the commodity shelf 601. Even when the customer cancels purchase of the specific commodity 701 after starting the settlement process, the customer only needs to insert the replacement 711 into the commodity information reader 410 and perform a cancel operation with the operation terminal 210 of the settlement apparatus 200. The customer need not go to the commodity shelf 601 to return the replacement 711 while suspending the settlement process. The customer need not call the clerk to return the actual specific commodity 701 to the clerk. The customer, who decided to purchase the specific commodity 701, only needs to certify the purchase qualification at the checkout counter 612 when he/she pays for the specific commodity 701.

Second Specific-Commodity Sales Method

In the above-described first sales method for the specific commodities 701, the replacement 711 is used for selecting the specific commodity 701 that the customer purchases. In the second sales method, a specific-commodity selection device 500 is used for selecting the specific commodity 701.

Figure 9:
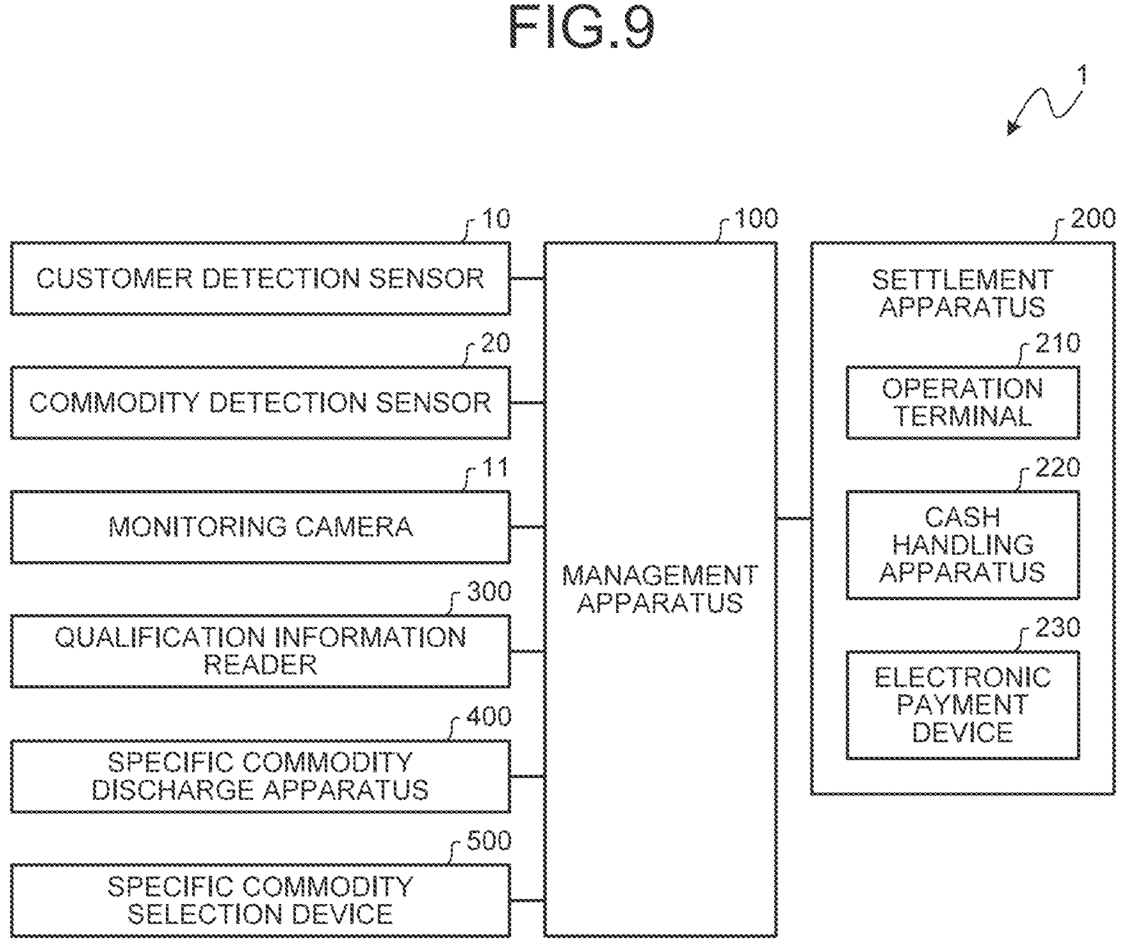
FIG. 9 illustrates an example of the configuration of the commodity sales system including a specific-commodity selection device.

FIG. 9 shows an example of the configuration of the commodity sales system 1 including the specific-commodity selection device 500. In an exemplary implementation, specific-commodity selection device 500 includes processing circuitry 100, which will be discussed later with respect to FIG. 14. In the configuration example of the commodity sales system 1 shown in FIG. 9, the commodity information reader 410 shown in FIG. 2 is not included, but the specific-commodity selection device 500, which is not included in the example of FIG. 2, is added.

Figure 10:
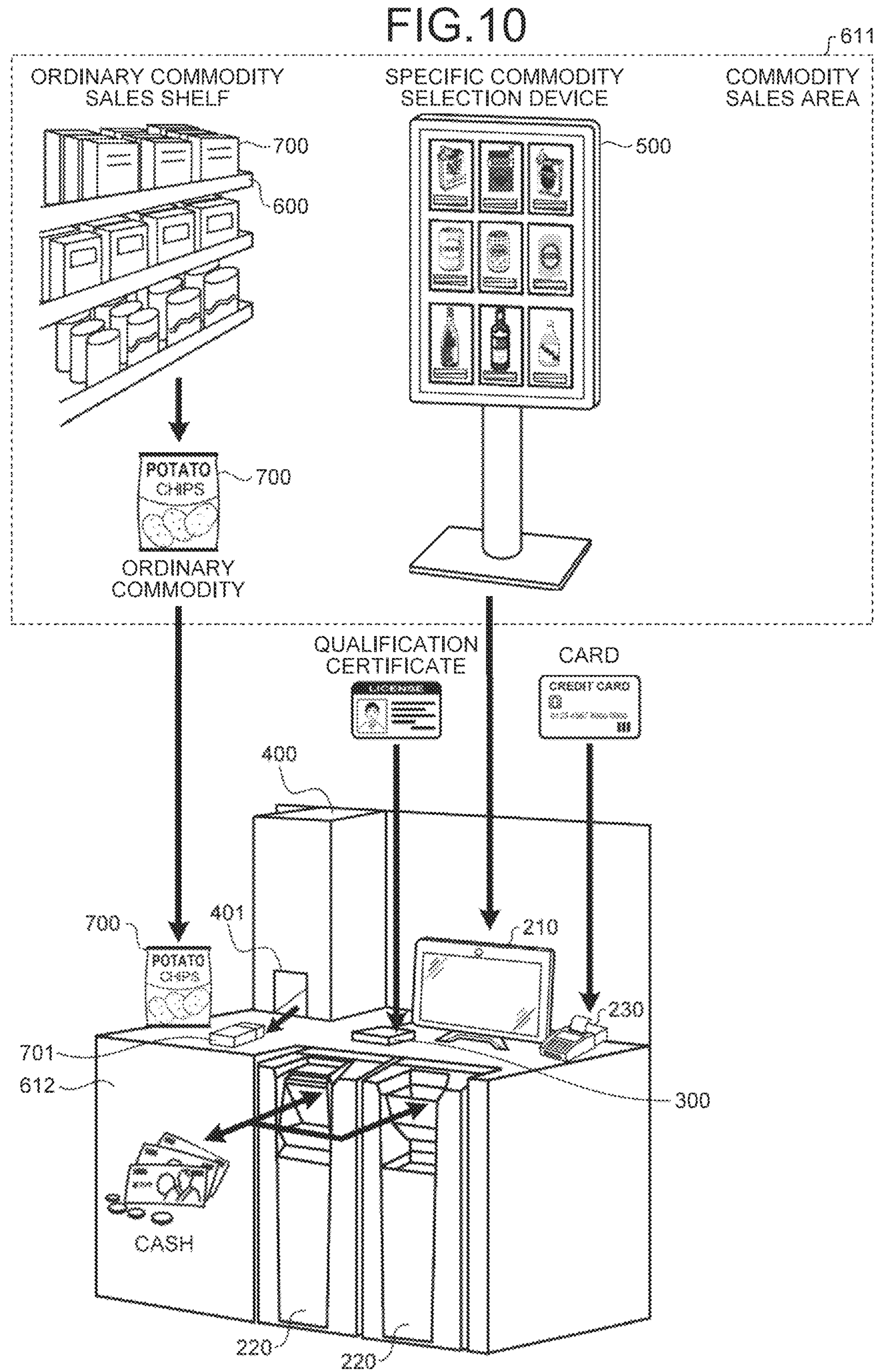
FIG. 10 illustrates a second sales method for specific commodities.

FIG. 10 illustrates the second sales method for the specific commodities 701. As shown in FIG. 10, the specific-commodity selection device 500 for selecting the specific commodity 701 is installed in the commodity sales area 611, in addition to the commodity shelf 600 in which the ordinary commodities 700 are displayed.

The specific-commodity selection device 500 includes an operation/display unit that is a touch panel type liquid crystal display device. The specific-commodity selection device 500 displays a selection screen that allows the customer to select a specific commodity 701 that the customer purchases. The customer can select the specific commodity 701 from among a plurality of specific commodities 701 registered in the management apparatus 100 in advance. For example, pieces of commodity information, such as the images, names, and prices of the specific commodities 701, are displayed in button forms on the selection screen. Alternatively, the commodity information may be separated from the selection button, and each selection button may be displayed near the corresponding commodity information on the selection screen.

The customer presses the button, on the selection screen of the specific-commodity selection device 500, corresponding to the specific commodity 701 to select and purchase it. Information on the specific commodity 701 selected by the customer is inputted to the management apparatus 100 from the specific-commodity selection device 500. The management apparatus 100, which is tracking the customer with the customer detection sensor 10, adds the specific commodity 701 selected with the specific-commodity selection device 500, to the object of transaction with the customer who is standing in front of the specific-commodity selection device 500 and performed the operation of pressing the button. That is, the specific commodity 701 selected by the customer through the specific-commodity selection device 500 is added to the commodities that the customer purchases.

When the customer moves to the checkout counter 612, the commodities to be purchased by the customer, which have been detected by the management apparatus 100, are displayed on the screen of the operation terminal 210, and the settlement process is started. The commodities to be purchased include the ordinary commodity 700 that the management apparatus 100 has detected by using the commodity detection sensor 20, and the specific commodity 701 that the management apparatus 100 has accepted the selection through the specific-commodity selection device 500.

The specific commodity 701 that the customer purchases has already been included in the object of transaction before the customer arrives the checkout counter. Therefore, among the steps described in FIG. 7, step S31 is not performed and the process is started from step S32. The processes such as the confirmation process of the purchase qualification, the settlement process based on the confirmation result, the handing over process by which the customer receives the actual specific commodity 701 after the settlement process, is performed in the same way as that of the first sales method for the specific commodities 701.

The specific-commodity selection device 500 may display a screen that allows the customer to select the ordinary commodities 700 in addition to the specific commodities 701. In a case where the ordinary commodities 700 can be purchased by using the specific-commodity selection device 500, the selected ordinary commodity 700 may be sold and handed over to the customer in the same method as that for the specific commodity 701. The commodity selection device may usually display the selection screen including only the ordinary commodities 700, and only when the purchase qualification of the customer has been confirmed, the commodity selection device may also display the selection screen for the specific commodities. For example, a selection screen for non-alcohol beverages may be displayed for the customer whose purchase qualification for alcohol beverages is not confirmed, whereas alcohol beverages may also be displayed in a selectable manner for the customer whose purchase qualification has been confirmed. A sales method of enabling the customer to select the specific commodities before starting the settlement process will be described later.

FIG. 10 is an example, and does not limit the configuration of the specific-commodity selection device 500. For example, a small touch-panel type liquid crystal display device may be disposed on the commodity shelf 600 to be used as the specific-commodity selection device 500. The specific-commodity selection device 500 may accept selection by the customer by using physical buttons instead of the touch panel buttons.

The specific-commodity selection device 500 may accept only selection of commodity numbers. For example, samples of the specific commodities 701 may be given commodity numbers, and each sample is displayed with the commodity numbers in the commodity shelf 600 or the like. The specific-commodity selection device 500 may accept input of the number of a specific commodity 701 to be purchased by the customer.

The specific-commodity selection device 500 may include the qualification information reader 300. In this case, after the management apparatus 100 has confirmed the purchase qualification of the customer by using the qualification information reader 300 of the specific-commodity selection device 500, the selection screen for the specific commodities 701 may be displayed to allow the customer to select a specific commodity 701. When the customer moves to the checkout counter 612, the purchase qualification has already been confirmed, and therefore, the settlement process is performed and the transaction amount is paid according to the same method as the purchase method for the ordinary commodities 700 described with reference to FIG. 1. Then, the specific commodity 701 purchased by the customer is discharged from the specific-commodity discharge apparatus 400 to end the transaction.

The specific-commodity selection device 500 may display the selection screen for the specific commodities 701 at a predetermined timing. For example, the display of the specific-commodity selection device 500 may usually be in the off state. The management apparatus 100 tracking the customer with the customer detection sensor 10 may control the specific-commodity selection device 500 to display the selection screen for the specific commodities 701 upon detecting that the customer has approached a range of a predetermined distance from the specific-commodity selection device 500. For example, using the customer detection sensor 10, the selection screen may be displayed only when the customer stands in front of the specific-commodity selection device 500. Alternatively, the selection screen may be displayed only when the customer stands in front of the specific-commodity selection device 500 with his/her face toward the selection screen. The specific-commodity selection device 500 may usually display advertisements or the like, and may display the selection screen for the specific commodities 701 when the customer has approached the device 500.

As described above, in the commodity sales system 1, the specific commodities 701 can be sold to the customer without displaying the actual specific commodities 701 on the shelf 601 in the commodity sales area 611 in the store. The customer who desires to purchase a specific commodity 701 selects the specific commodity 701 with the specific-commodity selection device 500, whereby the selected specific commodity 701 is added to the commodities the customer purchases. The customer moves to the checkout counter 612, and can receive the actual specific commodity 701 by certifying that he/she has the purchase qualification. The customer can purchase the specific commodity 701 without performing an operation such as the store membership registration in advance. When the customer cancels purchase of the specific commodity 701, the customer only needs to perform a cancel operation with the operation terminal 210 of the settlement apparatus 200. The customer needs to certify the purchase qualification only when he/she purchases the specific commodity 701.

Third Specific-Commodity Sales Method

In the above-described first and second sales methods for the specific commodities 701, the actual specific commodities 701 are not displayed in the commodity sales area 611. In the third sales method, a specific-commodity storage apparatus 450 in which actual specific commodities 701 are stored is installed in the commodity sales area 611.

Figure 11:
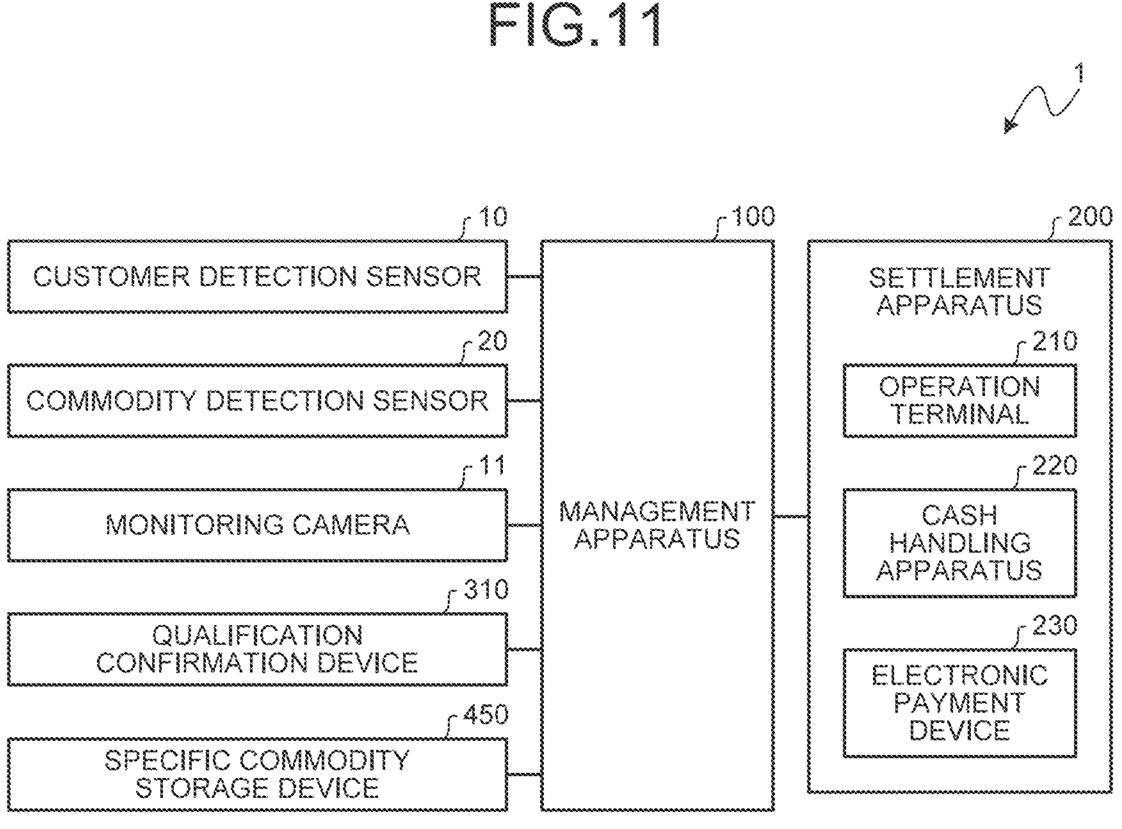
FIG. 11 illustrates an example of the configuration of the commodity sales system including a specific-commodity storage apparatus.

FIG. 11 shows an example of the configuration of the commodity sales system 1 including the specific-commodity storage apparatus 450. In the configuration example of the commodity system 1 shown in FIG. 11, the qualification information reader 300, the specific-commodity discharge apparatus 400, the commodity information reader 410, and the specific-commodity selection device 500 of the above described systems are not included, but a qualification confirmation device 310 and the specific-commodity storage apparatus 450, which are not included in the above described systems, are added.

Figure 12:
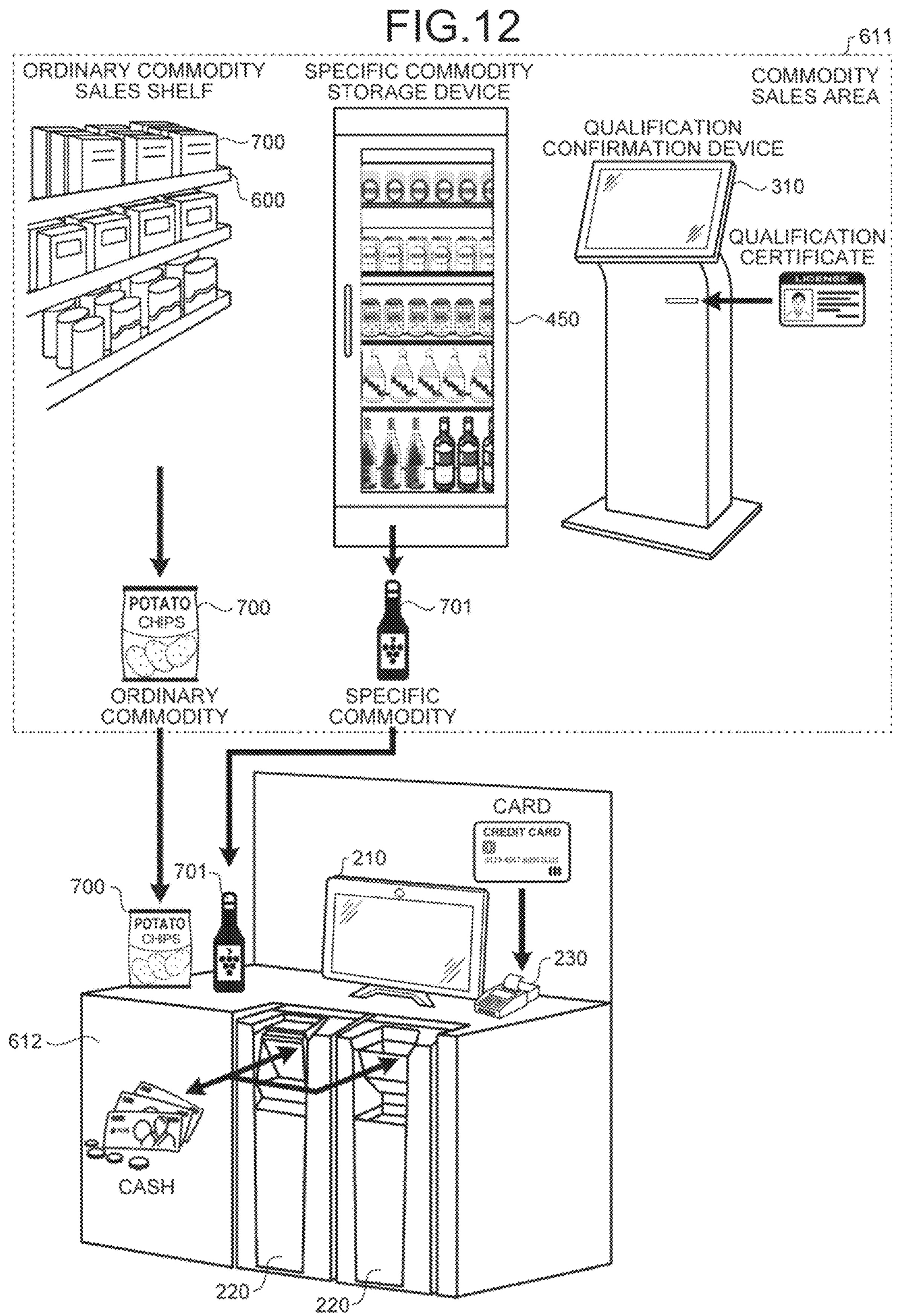
FIG. 12 illustrates a third sales method for specific commodities.

FIG. 12 illustrates the third sales method for the specific commodities 701. As shown in FIG. 12, the specific-commodity storage apparatus 450 in which the specific commodities 701 are stored, and the qualification confirmation device 310 are installed in the commodity sales area 611, in addition to the commodity shelf 600 in which the ordinary commodities 700 are displayed. The installation places of the device 310 and the apparatus 450 are not particularly limited. For example, the qualification confirmation device 310 is installed near the entrance of the store, and the specific-commodity storage apparatus 450 is installed alongside the commodity shelf 600 for the ordinary commodities 700.

The qualification confirmation device 310 is configured to include a touch panel type liquid crystal display device, and a qualification information reader 300. The housing of the qualification confirmation device 310 has an insertion port for inserting a qualification certificate. The qualification information reader 300 reads qualification information from the qualification certificated inserted from the insertion port.

The liquid crystal display device is disposed on an upper part of the qualification confirmation device 310. The qualification confirmation device 310 is installed near the entrance of the store, with the screen of the liquid crystal display device facing the customer who visits the store. The screen displays information instructing the customer, who will purchase a specific commodity 701, to perform a purchase qualification confirmation process in which the qualification confirmation device 310 reads his/her qualification certificate. The screen may display the kind of information to be acquired from the qualification certificate, the fact that the acquired information will be deleted after the customer leaves the store when the transaction has been finished normally, and the like.

The customer who enters the store from the entrance checks the screen of the qualification confirmation device 310. The customer, who desires to purchase a specific commodity 701, starts the process for certifying that he/she has a purchase qualification for the specific commodity 701. When the customer presses a process start button on the screen, information instructing the customer to insert a qualification certificate such as a driver's license is displayed on the screen. When the customer inserts the qualification certificate into the insertion port, the qualification confirmation device 310 takes the qualification certificate therein, and reads qualification information by the qualification information reader 300. After reading the qualification information, the qualification confirmation device 310 returns the qualification certificate from the insertion port to the customer. The qualification information read by the qualification confirmation device 310 is inputted to the management apparatus 100. The management apparatus 100 confirms that the customer has the purchase qualification for the specific commodities 701, based on the qualification information. The confirmation result is displayed on the screen of the qualification confirmation device 310.

The management apparatus 100 tracking the customer with the customer detection sensor 10 from when the customer entered the store, associates information on the customer operating the qualification confirmation device 310 with the result of the purchase qualification confirmation process. After confirming that the customer has the purchase qualification, the management apparatus 100 treats this customer as a customer having the purchase qualification for the specific commodities 701.

As shown in FIG. 12, the specific-commodity storage apparatus 450 has a commodity shelf therein such that the specific commodities 701 can be displayed in the apparatus 450, like the commodity shelf 600 for the ordinary commodities 700. The commodity shelf in the specific-commodity storage apparatus 450 is also provided with a commodity detection sensor 20 for detecting the specific commodity 701 that the customer purchases, like the commodity shelf 600 for the ordinary commodities 700. Using the commodity detection sensor 20, the management apparatus 100 can detect the names and the number of specific commodities 701 that the customer takes out from the specific-commodity storage apparatus 450. The management apparatus 100 can also detect the names and the number of specific commodities 701 that the customer returns to the specific-commodity storage apparatus 450.

Figure 13:
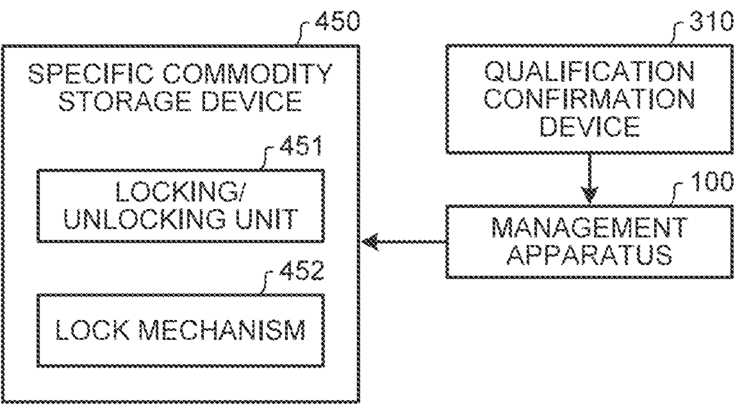
FIG. 13 illustrates an example of the configuration of the specific-commodity storage apparatus.

FIG. 13 illustrates an example of the configuration of the specific-commodity storage apparatus 450. The specific-commodity storage apparatus 450 includes: a lock mechanism 452 that locks the apparatus 450 such that the specific commodities 701 cannot be taken out from the commodity shelf; and a locking/unlocking unit 451 that controls the lock mechanism 452. The specific-commodity storage apparatus 450 has an openable/closable door that can be locked by the lock mechanism 452 so as not to be opened by the customer. The type of the lock mechanism 452 is not particularly limited. For example, an electromagnetic lock may be used.

When the management apparatus 100 tracking the customer with the customer detection sensor 10 detects that the customer whose purchase qualification has been confirmed by the qualification confirmation device 310 approaches a range of a predetermined distance from the specific-commodity storage apparatus 450, the management apparatus 100 controls the specific-commodity storage apparatus 450 to unlock the door. For example, using the customer detection sensor 10, the door may be unlocked when the customer stands in front of the specific-commodity storage apparatus 450. Alternatively, the door may be unlocked when the customer stands in front of the specific-commodity storage apparatus 450 with his/her face toward the apparatus 450. After the locking/unlocking unit 451 unlocks the door by controlling the lock mechanism 452, the customer can open the door and take out the specific commodity 701 from the specific-commodity storage apparatus 450.

If the customer has done the purchase qualification confirmation process by using the qualification confirmation device 310, the customer can open the door and take out the specific commodity 701 by merely moving to the front of the specific-commodity storage apparatus 450. When the customer takes out the specific commodities 701 from the specific-commodity storage apparatus 450, the management apparatus 100 detects the names and the number of the specific commodities 701 by using the commodity detection sensor 20, and adds the specific commodities 701 to the object of transaction with the customer. The management apparatus 100 detects that the customer closes the door and leaves the specific-commodity storage apparatus 450, and controls the specific-commodity storage apparatus 450 to lock the door. Since the door is locked by the lock mechanism 452 under control of the locking/unlocking unit 451, other customers cannot take out the specific commodities 701.

When the customer moves to the checkout counter 612, the commodities that have been detected by the management apparatus 100 as the commodities to be purchased by the customer are displayed on the transaction screen of the operation terminal 210, and the settlement process is started. The commodities to be purchased by the customer may include the ordinary commodity 700 that the management apparatus 100 has detected by using the commodity detection sensor 20 at the commodity shelf 600, and the specific commodity 701 that the management apparatus 100 has detected by using the commodity detection sensor 20 of the specific-commodity storage apparatus 450.

The specific commodity 701 that the customer purchases has already been included in the object of transaction with the customer. The qualification confirmation device 310 has already confirmed that the customer has the purchase qualification for the specific commodity 701. Therefore, the settlement process is performed to end the transaction with the customer according to the same method as the purchase method for the ordinary commodities 700 described with reference to FIG. 1.

In the third method, the customer already has the actual specific commodity 701 in hand when starting the settlement process at the checkout counter 612. Therefore, if the customer performs an operation to cancel purchase of the specific commodity 701 with the operation terminal 210 of the settlement apparatus 200, the management apparatus 100 performs a notification process of instructing the clerk to receive the cancelled specific commodity 701. Upon receiving the notification, the clerk moves from the back office 613 to the checkout counter 612, and receives the canceled specific commodity 701.

FIG. 12 is an example, and does not limit the configurations of the qualification confirmation device 310 and the specific-commodity storage apparatus 450. For example, the qualification confirmation device 310 may be provided with a reader for reading qualification information from a qualification certificate, in the vicinity of the liquid crystal display device disposed on the upper side, and the customer may put a qualification certificate over the reader to cause the reader to read the qualification certificate. Instead of or in addition to the qualification confirmation device 310 at the entrance, a qualification confirmation device 310 may be installed near the specific-commodity storage apparatus 450. The specific-commodity storage apparatus 450 may include the qualification information reader 300 and serve as the qualification confirmation device 310.

The specific-commodity storage apparatus 450 may be provided with a physical button, and the management apparatus 100 may unlock the door of the specific-commodity storage apparatus 450 on the condition that the customer who presses the physical button has already done the purchase qualification confirmation process with the qualification confirmation device 310. For example, the handle of the door may serve as the physical button, and the door may be unlocked when the customer whose purchase qualification has been confirmed puts his/her hand on the handle. The specific-commodity storage apparatus 450 may be provided with a plurality of doors, and each door may be locked and unlocked. For example, the storage space of the specific-commodity storage apparatus 450 may be divided into a plurality of spaces for a commodity shelf for cigarettes, a commodity shelf for alcohol, and the like, and each space may be provided with a door. Alternatively, a plurality of specific-commodity storage apparatus 450, each of which is provided for cigarettes, alcohol, and the like, may be installed in the commodity sales area 611.

As described above, in the commodity sales system 1, the customer who desires to purchase a specific commodity 701 can take out and purchase the specific commodity 701 from the specific-commodity storage apparatus 450 by merely performing the purchase qualification confirmation process by using the qualification confirmation device 310, without performing an operation such as the store membership registration in advance.

While a plurality of sales methods for the specific commodities 701 have been described in the present embodiment, the respective methods may not necessarily be separately performed, and some of the methods may be used in combination. For example, a plurality of sales methods may be used for selling the specific commodities 701 such that some of the specific commodities 701 are sold by the first sales method while the other specific commodities 701 are sold by the second sales method.

The first or second sales method may be used to cause the customer to select the specific commodity 701, and the specific commodity 701 may be handed over to the customer by using the specific-commodity storage apparatus 450 described in the third method, instead of the specific-commodity discharge apparatus 400. After the qualification of the customer is confirmed by using the qualification confirmation device 310 as described in the third sales method, the customer may be caused to select and purchase the specific commodity 701 as described in the first or second sales method.

In the third sales method shown in FIG. 12, the specific-commodity storage apparatus 450 serves as a commodity handling device that makes a specific commodity 701 selectable by the customer whose purchase qualification for the specific commodity 701 has been confirmed by the qualification confirmation device 310. However, instead of or in addition to the specific-commodity storage apparatus 450, the specific-commodity selection device 500 shown in FIG. 10 may serve as the commodity handling device in the third sales method. In this case, the specific-commodity selection device 500 may display a screen that allows selection of the specific commodity 701 for the customer who has finished the purchase qualification confirmation process with the qualification confirmation device 310. On the other hand, for the customer whose purchase qualification is not confirmed, the specific-commodity selection device 500 may turn off the screen or display a selection screen for the ordinary commodities 700. When the customer whose purchase qualification has been confirmed adds the specific commodity 701 to the object of transaction, taking-out of the specific commodity 701 from the specific-commodity storage apparatus 450 or selection of the specific commodity 701 with the specific-commodity selection device 500 is allowed, whereby the specific commodity 701 can be sold as described above. For example, by using the customer detection sensor 10, taking-out or selection of the specific commodity 701 may be allowed when the customer stands in front of the device or when the customer stands in front of the device with his/her face toward the device.

In the present embodiment, a plurality of examples of commodity sales have been described. In any example, it can be set that information on the customer acquired by the management apparatus 100 is deleted after the customer leaves the store. Specifically, data on the customer and data on the purchase qualification of the customer, which are detected by the customer detection sensor 10, the monitoring camera 11, the qualification information reader 300, the qualification confirmation device 310, and the like, may be set to be deleted when the customer leaves the store. For example, a display device for notifying the customer of the data handling method is installed near the entrance of the store. On the screen of the display device, the management apparatus 100 displays: the kind of data on the customer to be acquired during shopping in the store; the purpose of use of the data; and information indicating that the all acquired data on the customer will be completely deleted after the customer leaves the store. In addition, on the screen of the display device, the management apparatus 100 displays information indicating that the customer can purchase the ordinary commodities 700 and the specific commodities 701 without the store membership registration. This allows the customer who does not like disclosure of personal information to readily recognize that he/she can easily use the unmanned store.

In the present embodiment, the commodity sales system 1 includes the management apparatus 100, the settlement apparatus 200, the qualification information reader 300, the qualification confirmation device 310, the specific-commodity discharge apparatus 400, the commodity information reader 410, the specific-commodity storage apparatus 450, and the specific-commodity selection device 500. The respective components of the commodity sales system 1 are conceptually functional components, and thus may not necessarily be physically limited thereto. For example, the management apparatus 100 may realize a part of the function and the operation of the settlement apparatus 200. The settlement apparatus 200 may realize a part of the function and the operation of the management apparatus 100. Distributed or integrated forms of each device are not limited to the forms described above, and all or some of the forms may be distributed or integrated functionally or physically in any unit depending on various loads, use statuses, or the like.

Figure 14:
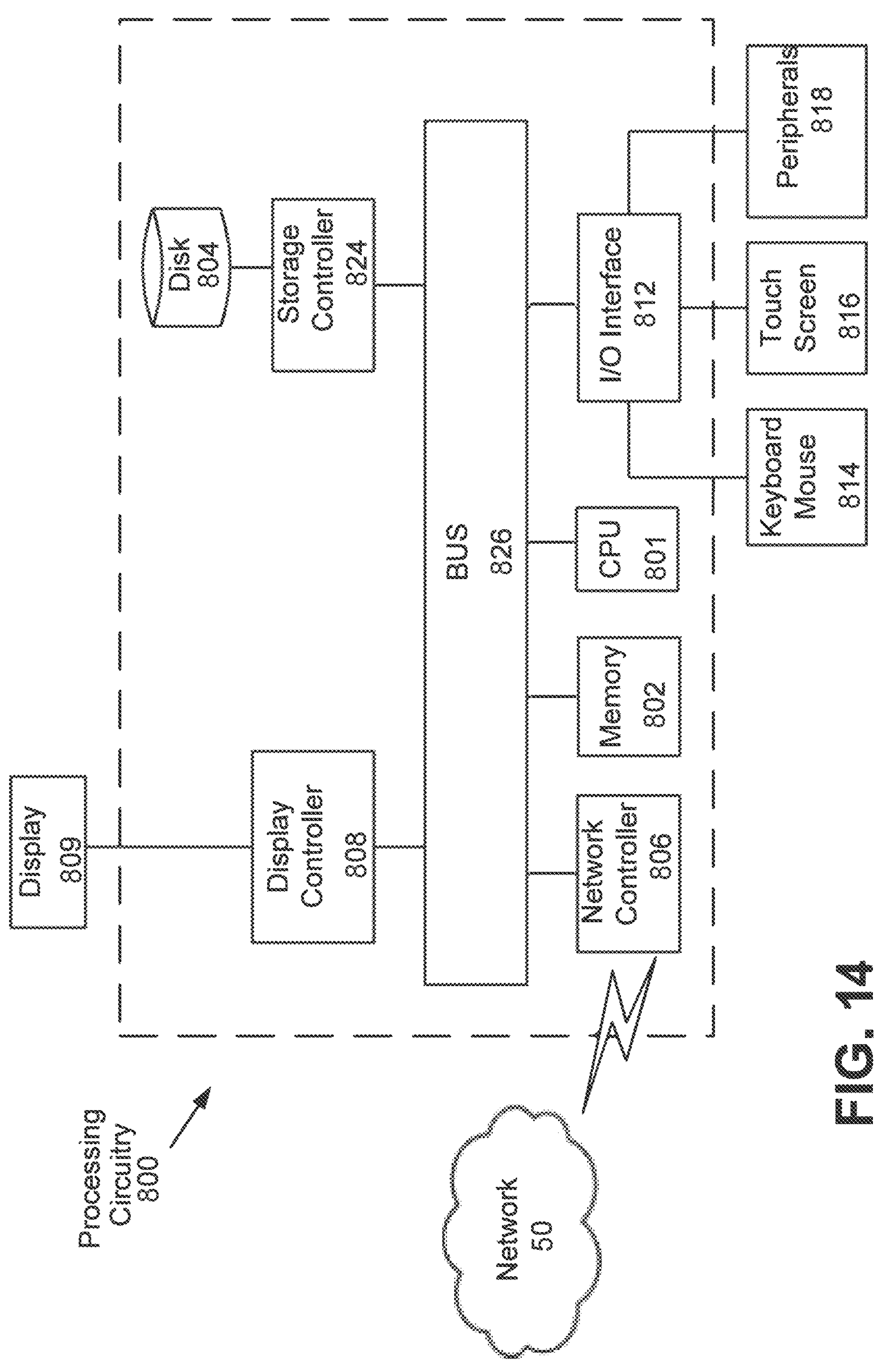
FIG. 14 is a block diagram of processing circuitry that performs computer-based operations in accordance with the present disclosure.

FIG. 14 is a block diagram of processing circuitry that performs computer-based operations in accordance with the present disclosure. FIG. 14 illustrates processing circuitry 800 of management apparatus 100, settlement apparatus 200, qualification information reader 300, specific commodity discharge apparatus 400, and specific commodity selection device 500.

Processing circuitry 800 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), circuitry and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

In FIG. 14, the processing circuitry 800 includes a CPU 801 which performs one or more of the control processes discussed in this disclosure. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 800 communicates, such as a server or computer. The processes may also be stored in network based storage, cloud-based storage or other mobile accessible storage and executable by processing circuitry 800.

The hardware elements in order to achieve the processing circuitry 800 may be realized by various circuitry elements. Further, each of the functions of the above described embodiments may be implemented by circuitry, which includes one or more processing circuits. A processing circuit includes a particularly programmed processor, for example, processor (CPU) 801, as shown in FIG. 14.

In FIG. 14, the processing circuitry 800 may be a computer or a particular, special-purpose machine. Processing circuitry 800 is programmed to execute processing to perform functions of the associated hardware.

Alternatively, or additionally, the CPU 801 may be implemented on an FPGA, ASIC, PLD or using discrete logic circuits, as one of ordinary skill in the art would recognize. Further, CPU 801 may be implemented as multiple processors cooperatively working in parallel to perform the instructions of the inventive processes described above.

The processing circuitry 800 in FIG. 14 may include a network controller 806, such as an Ethernet PRO network interface card, for interfacing with network 50. As can be appreciated, the network 50 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 50 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 806 may be compliant with other direct communication standards, such as Bluetooth, a near field communication (NFC), infrared ray or other.

The processing circuitry 800 may include a display controller 808, such as a graphics card or graphics adaptor for interfacing with display 809, such as a monitor. An I/O interface 812 interfaces with a keyboard and/or mouse 814 as well as a touch screen panel 816 on or separate from display 809. I/O interface 812 also connects to a variety of peripherals 818.

The storage controller 824 connects the storage medium disk 804 with communication bus 826, which may be an ISA, EISA, VESA, PCI, or similar, for interconnecting all of the components of the processing circuitry 800. A description of the general features and functionality of the display 809, keyboard and/or mouse 814, as well as the display controller 808, storage controller 824, network controller 806, and I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

A commodity sales system according to the present disclosure is a system for selling a specific commodity for which a purchase qualification needs to be confirmed when the specific commodity is sold to a customer. The system includes: a customer detection sensor configured to detect a customer who has entered a store; a commodity detection sensor configured to detect a commodity that the customer takes out from a commodity shelf; a confirmation device configured to confirm a purchase qualification for a specific commodity by performing a confirmation process on a qualification certifying matter; a commodity handling device configured to make the specific commodity selectable for the customer whose purchase qualification has been confirmed by the confirmation process; a management apparatus configured to add, to an object of transaction with the customer, a commodity that is detected by using the customer detection sensor and the commodity detection sensor, and a commodity that is selected with the commodity handling device; and a settlement apparatus configured to perform a settlement process for an amount of transaction with the customer, for the commodities that the management apparatus has added to the object of transaction.

In the above configuration, the commodity handling device may be a storage device that is locked to prevent the specific commodity from being taken out, and the storage device may be unlocked when the customer whose purchase qualification has been confirmed adds the specific commodity to the object of transaction.

In the above configuration, the commodity handling device may be a selection device that displays a selection screen for purchase commodities. When the customer whose purchase qualification has been confirmed adds the specific commodity to the object of transaction, the specific commodity may be displayed on the selection screen in a selectable manner.

In the above configuration, after the settlement process, the management apparatus may delete information on the customer which has been acquired by the confirmation device.

In the above configuration, the qualification certifying matter may include information on the purchase qualification, and the management apparatus may perform the confirmation process, based on the information read by the confirmation device.

In the above configuration, the confirmation device may display a result of the confirmation process.

In the above configuration, the confirmation device may be installed near an entrance of the store.

In the above configuration, the commodity handling device may include the confirmation device.

In the above configuration, the specific commodity may be an age-limited commodity for which age of purchasers is limited, and the confirmation process may include a process to confirm age of the customer.

In the above configuration, the specific commodity may include at least one of alcohol and cigarettes.

A commodity sales method according to the present disclosure is a method for selling a specific commodity for which a purchase qualification needs to be confirmed when the specific commodity is sold to a customer. The method includes: detecting a customer who has entered a store, by using a customer detection sensor; detecting a commodity that the customer takes out from a commodity shelf, by using a commodity detection sensor; confirming that the customer has a purchase qualification for a specific commodity, by using a confirmation device; making the specific commodity selectable with a commodity handling device, for the customer whose purchase qualification has been confirmed; adding, to an object of transaction with the customer, a commodity that is detected by using the customer detection sensor and the commodity detection sensor, and a commodity that is selected with commodity handling device; and performing, by using a settlement apparatus, a settlement process for an amount of transaction with the customer, for the commodities added to the object of transaction.

The commodity sales system and the commodity sales method according to the present disclosure realize an unmanned store that can be used without membership registration, and that is easy to use for customers who purchase specific commodities such as age-limited commodities.

As described above, in the commodity sales system, the specific commodity for which a purchase qualification needs to be confirmed at the time of selling at a store, can be sold to the customer in the store called an unmanned store or a manpower-saving store. The customer need not perform an operation such as the store membership registration to use the store. The customer can purchase the specific commodity by certifying his/her purchase qualification with a predetermined qualification certificate. When the customer leaves the store, the store can delete data on the customer which have been acquired in the store to sell the commodity to the customer, thereby making the store easy to use for the customer who places high importance on handling of personal information.

What is claimed is:

1. A commodity sales system, comprising:

a customer detection sensor to detect that a customer has entered a store;

a commodity detection sensor to detect a commodity that the customer takes from a commodity shelf in the store;

a plurality of replacement specific commodities corresponding to specific commodities, each replacement specific commodity comprising a graphic code;

a confirmation device including first processing circuitry configured to, when the customer detection sensor detects that the customer has entered the store, perform a confirmation process to confirm whether the customer satisfies an age verification to purchase a specific commodity;

a commodity handling device configured to make the specific commodity selectable for the customer in a case that the age verification is confirmed by the confirmation device, wherein the commodity handling device includes a specific-commodity discharge apparatus including:

a plurality of storages to store specific commodities for each commodity type, and, a plurality of doors, each door of the plurality of doors corresponding to a respective storage of the plurality of storages;

a management apparatus including second processing circuitry configured to add, to an object of transaction with the customer, the commodity detected by commodity detection sensor, and the specific commodity selected with the commodity handling device;

delete the age verification after the customer leaves the store; and control, in the case that the graphic code of a selected replacement specific commodity is read and the age verification is confirmed by the confirmation device, a lock mechanism of the respective storage of a specific commodity corresponding to the selected replacement specific commodity, wherein the lock mechanism is unlocked in response to the control; and a settlement apparatus including third processing circuitry configured to perform a settlement process for an amount of the transaction with the customer, for the commodities that the management apparatus has added to the object of transaction.

2. The commodity sales system according to claim 1, wherein the commodity handling device further includes a selection device that displays a selection screen for purchase commodities, and the specific commodity is displayed on the selection screen in a selectable manner when adding the specific commodity by the customer whose age verification has been confirmed.

3. The commodity sales system according to claim 1, wherein the second processing circuitry deletes, after the settlement process, information on the customer which has been acquired by the confirmation device.

4. The commodity sales system according to claim 1, wherein a qualification certifying matter read by the confirmation device includes age information of the customer, and the first processing circuitry performs the confirmation process based on the age information read by the confirmation device.

5. The commodity sales system according to claim 1, wherein the confirmation device displays a result of the confirmation process.

6. The commodity sales system according to claim 1, wherein the commodity handling device includes the confirmation device.

7. The commodity sales system according to claim 1, wherein the specific commodity is an age-limited commodity for which age of purchasers is limited.

8. The commodity sales system according to claim 7, wherein the specific commodity includes at least one of alcohol and cigarettes.

9. A commodity sales method comprising:

detecting, by a customer detection sensor, that a customer has entered a store;

detecting, by a commodity detection sensor, a commodity that the customer takes from a commodity shelf in the store;

providing, in the store, a plurality of replacement specific commodities corresponding to specific commodities, each replacement specific commodity comprising a graphic code;

performing, by a confirmation device when the customer detection sensor detect that the customer has entered the store, a confirmation process to confirm whether the customer satisfies an age verification to purchase a specific commodity;

making the specific commodity selected with a commodity handling device in a case that the age verification is confirmed by the confirmation device, wherein the commodity handling device includes a specific-commodity discharge apparatus including:

a plurality of storages to store specific commodities for each commodity type, and, a plurality of doors, each door of the plurality of doors corresponding to a respective storage of the plurality of storages;

adding, to an object of transaction with the customer, the commodity detected by the commodity detect sensor, and the specific commodity selected with commodity handling device;

deleting the age verification after the customer leaves the store;

controlling, in the case that the graphic code of a selected replacement specific commodity is read and the age verification is confirmed by the confirmation device, a lock mechanism of the respective storage unit of a specific commodity corresponding to the selected replacement specific commodity, wherein the lock mechanism is unlocked in response to the controlling;

performing, by a settlement apparatus, a settlement process for an amount of the transaction with the customer, for the commodities added to the object of the transaction.

* * * * *